US011346998B2

(12) United States Patent
Arihara et al.

(10) Patent No.: US 11,346,998 B2
(45) Date of Patent: May 31, 2022

(54) DISPLAY MODULE

(71) Applicant: Panasonic Intellectual Property Management Co., Ltd., Osaka (JP)

(72) Inventors: Tsutomu Arihara, Kanagawa ken (JP); Masami Yoda, Kanagawa ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/183,974

(22) Filed: Feb. 24, 2021

(65) Prior Publication Data
US 2021/0271016 A1    Sep. 2, 2021

(30) Foreign Application Priority Data
Feb. 27, 2020    (JP) .............................. JP2020-032329

(51) Int. Cl.
*F21V 8/00* (2006.01)
*G02F 1/1333* (2006.01)

(52) U.S. Cl.
CPC ......... *G02B 6/0088* (2013.01); *G02B 6/0078* (2013.01); *G02F 1/13336* (2013.01); *G02F 1/133314* (2021.01); *G02F 1/133317* (2021.01)

(58) Field of Classification Search
CPC .. G02B 6/0078; G02B 6/0088; G02B 6/0091; G02F 1/133314; G02F 1/133317; G02F 1/13336
See application file for complete search history.

(56) References Cited

U.S. PATENT DOCUMENTS

| 2016/0223739 | A1* | 8/2016 | Yoon | G02B 6/0031 |
| 2017/0123133 | A1* | 5/2017 | Park | G02B 6/0091 |
| 2020/0333655 | A1* | 10/2020 | Jeon | G02F 1/133308 |

FOREIGN PATENT DOCUMENTS

| JP | 2015-052732 | 3/2015 |
| JP | 6234618 | 11/2017 |

* cited by examiner

*Primary Examiner* — Keith G. Delahoussaye
(74) *Attorney, Agent, or Firm* — Greenblum & Bernstein, P.L.C.

(57) ABSTRACT

A display module includes a plurality of display panels, a backlight module, a middle frame member, a rear frame member, and a structure. The backlight module includes a plurality of light guide plates disposed in back of the plurality of display panels and a light emitting element disposed around the plurality of light guide plates. The middle frame member is disposed in back of the plurality of display panels and in front of the plurality of light guide plates, and includes a plurality of openings corresponding to the plurality of display panels. The rear frame member is disposed in back of the plurality of light guide plates, and includes a housing that houses the plurality of light guide plates. The structure fixes or positions the plurality of light guide plates to the housing.

12 Claims, 24 Drawing Sheets

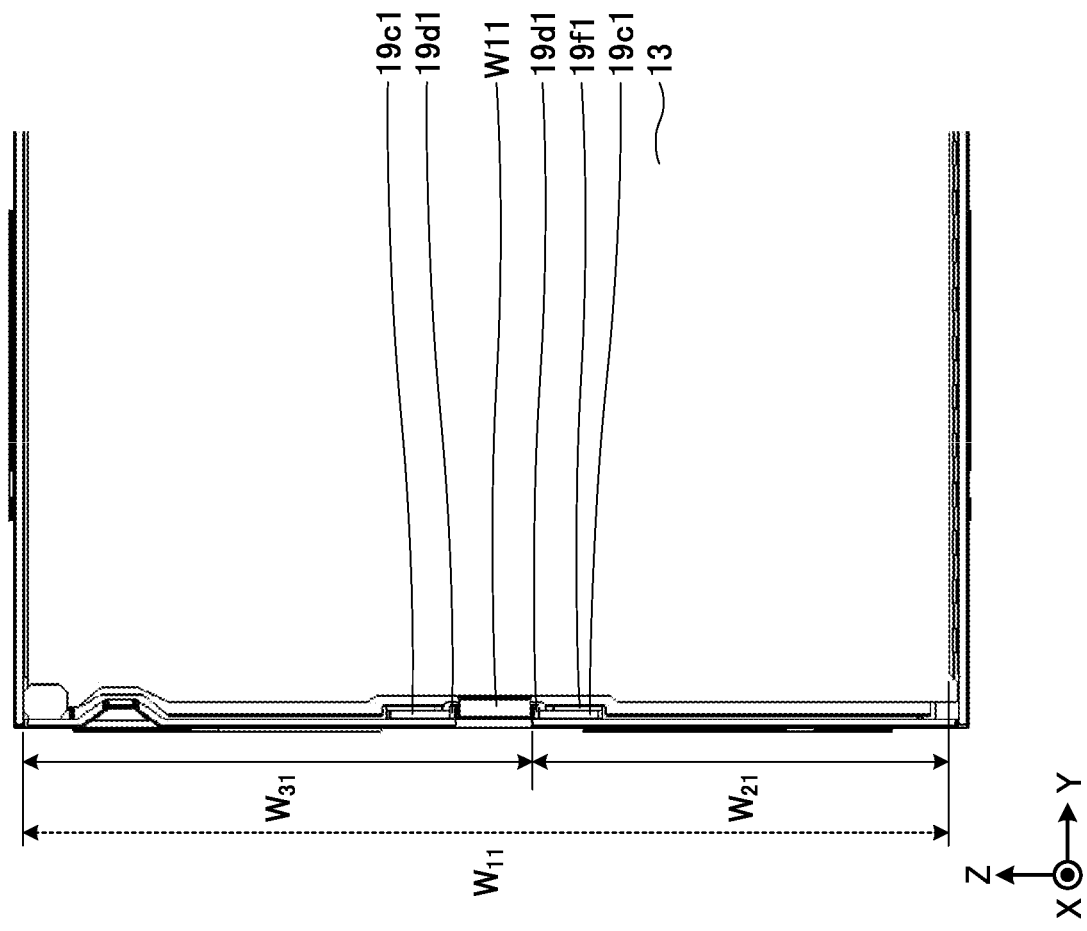
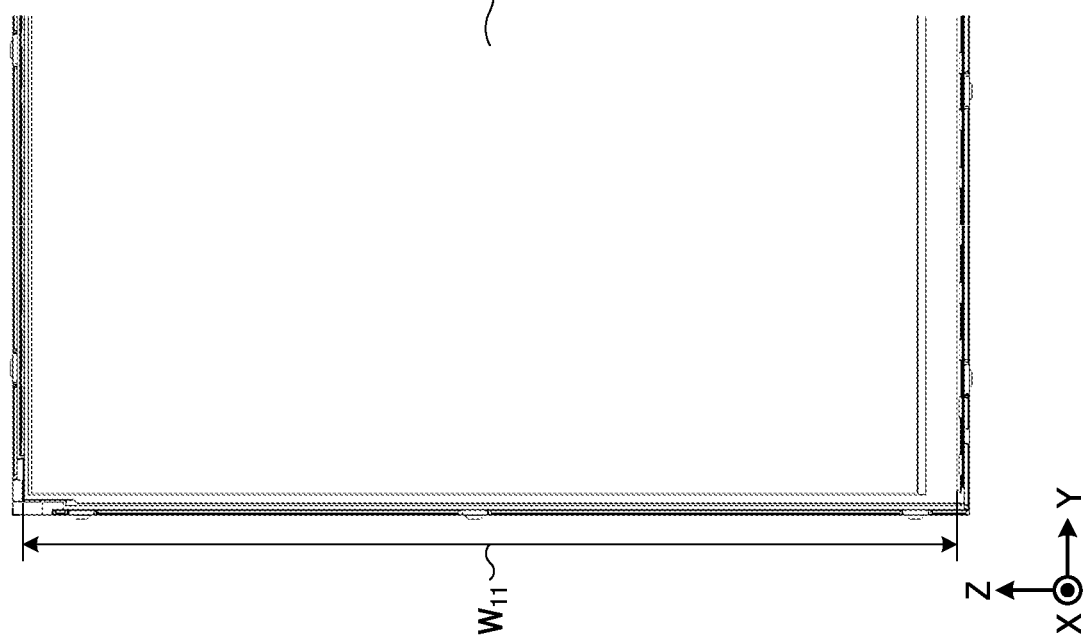

DISPLAY MODULE

CROSS-REFERENCE TO RELATED APPLICATIONS

This application is based upon and claims the benefit of priority from Japanese Patent Application No. 2020-032329, filed on Feb. 27, 2020, the entire contents of which are incorporated herein by reference.

FIELD

The present disclosure relates to a display module.

BACKGROUND

As a display module including a plurality of display panels, exemplified is a display device disclosed in Japanese Patent Application Laid-open No. 2015-52732, for example.

The present disclosure provides a display module with which assembly work can be facilitated.

SUMMARY

A display module according to the present disclosure includes a plurality of display panels, a backlight module, a middle frame member, a rear frame member, and a structure. The backlight module includes a plurality of light guide plates disposed in back of the plurality of display panels and a light emitting element disposed around the plurality of light guide plates. The middle frame member is disposed in back of the plurality of display panels and in front of the plurality of light guide plates, and includes a plurality of openings corresponding to the plurality of display panels. The rear frame member is disposed in back of the plurality of light guide plates, and includes a housing that houses the plurality of light guide plates. The structure fixes or positions the plurality of light guide plates to the housing.

BRIEF DESCRIPTION OF THE DRAWINGS

FIGS. 20A and 20B are diagrams illustrating narrowing of a picture frame according to the embodiment;

DETAILED DESCRIPTION

The following describes an embodiment of a display module according to the present disclosure with reference to the drawings.

Embodiment

The display module according to the embodiment includes a plurality of display panels, and may be disposed on a front console of a driver's seat of a vehicle, for example. Each of the display panels is, for example, a liquid crystal panel, an organic Electronic Luminescent (EL) panel, and the like. The front console may be required to display supplementary information such as car audio and car navigation in addition to display of information related to a vehicle state such as a traveling speed and a fuel residual amount. The display module including the display panels has a structure appropriate for two-screen display in a vehicle.

To implement two-screen display, the display panels may be separated from each other and arranged side by side in a horizontal direction to configure the display module. In this display module, a plurality of light guide plates that emit light to the display panels are separated from each other and arranged side by side in the horizontal direction, and a plurality of frame members for fixing the light guide plates are configured as separated members. With this configuration, a width of a picture frame of the display module tends to be increased by enhancing strength of the frame members, for example, and front visibility may be limited in a case in which the display module is disposed on the front console of the driver's seat.

On the other hand, the display module may be configured by arranging the display panels to be adjacent to each other in the horizontal direction. In this display module, the light guide plates are arranged to be adjacent to each other in the horizontal direction, and a common frame member for fixing the light guide plates is configured to be an integrated member. With this configuration, the width of the picture frame can be narrowed, but a size of the frame member is increased, so that a dimensional tolerance with respect to the light guide plates tends to be caused in a case of fixing the light guide plates by the frame member. Accordingly, at the time of assembling the light guide plates to the frame member, a manufacturing yield may be reduced because the light guide plate is attached to an inappropriate position of the frame member, or the light guide plate is attached thereto to easily slip off.

Thus, in the present embodiment, a structure for fixing or positioning the light guide plates to a housing of a rear frame member that houses the light guide plates is disposed in the display module to facilitate assembly work and improve the manufacturing yield.

Figure 1:
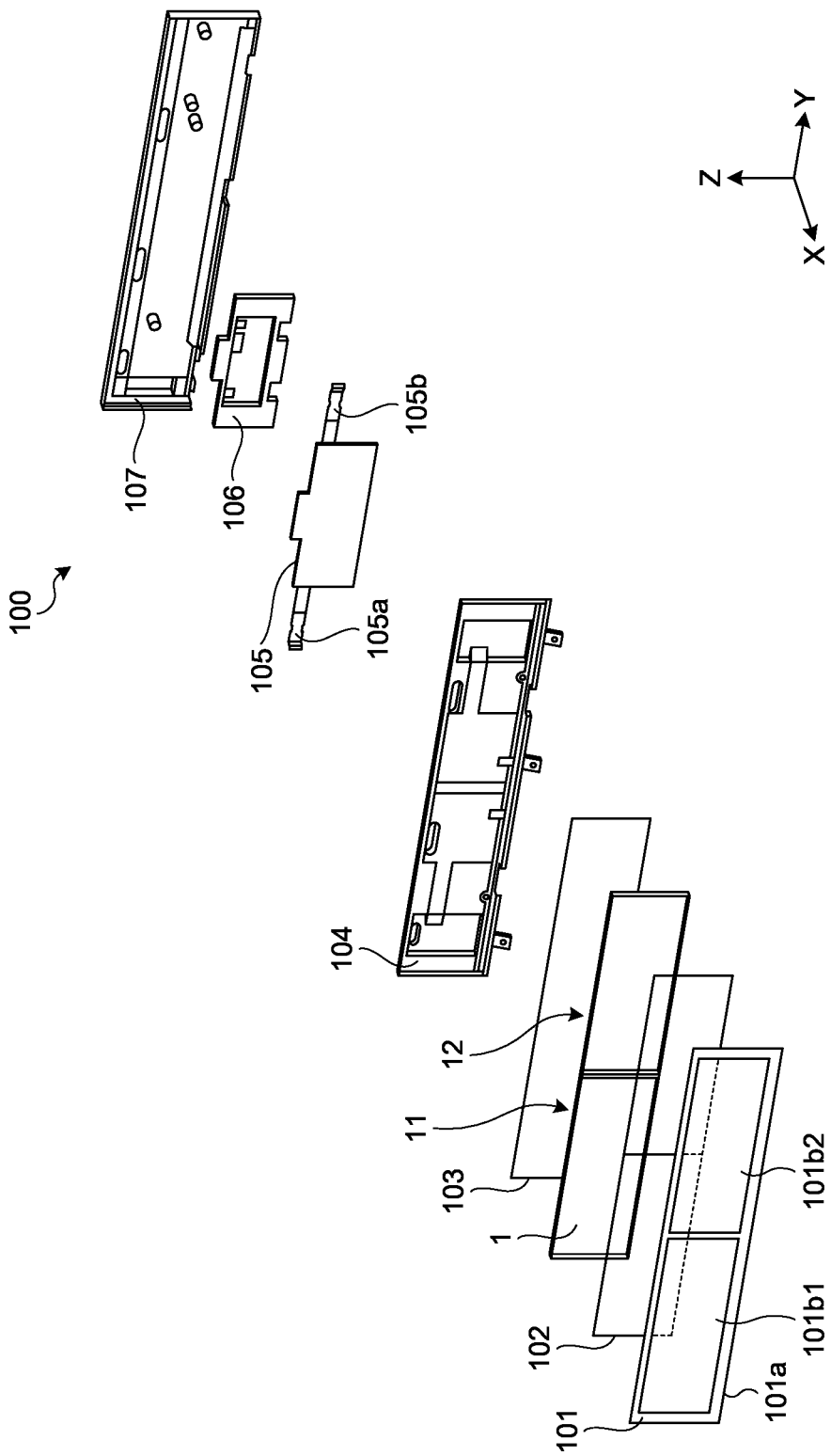
FIG. 1 is an exploded perspective view illustrating a configuration of a vehicle-mounted member including a display module according to an embodiment.

Specifically, a display module 1 may be applied to a vehicle-mounted member 100 as illustrated in FIG. 1. FIG. 1 is an exploded perspective view illustrating a configuration of the vehicle-mounted member 100 including the display module 1. In FIG. 1, a lateral direction of a display panel is assumed to be a Z-direction, a longitudinal direction thereof is assumed to be a Y-direction, and a direction perpendicular to the Z-direction and the Y-direction is assumed to be an X-direction. When the vehicle-mounted member 100 is disposed in a vehicle, the Z-direction becomes a direction along a vertical direction, and the XY-direction becomes a direction along a horizontal plane.

The vehicle-mounted member 100 includes a front cover 101, a sheet member 102, the display module 1, a sheet member 103, a rear cover 104, a circuit board 105, a board cover 106, and a protective panel member 107. The display module 1 includes a plurality of display panels 11 and 12.

The front cover 101 is disposed on the +X side of the sheet member 102, extends in the YZ-direction in a plate shape, and has a substantially rectangular shape, the longitudinal direction of which is the Y-direction. The sheet member 102 is disposed on the +X side of the display module 1, extends in the YZ-direction in a plate shape, and has a substantially rectangular shape, the longitudinal direction of which is the Y-direction. The front cover 101 is stuck on a front surface of the display module 1 via the sheet member 102 to protect the front surface (a surface on the +X side) of the display module 1. The front cover 101 includes a frame member 101*a* having a plurality of openings corresponding to the display panels 11 and 12, and a plurality of cover glasses 101*b*1 and 101*b*2 that cover the openings of the frame member 101*a*. The cover glasses 101*b*1 and 101*b*2 may be made of inorganic glass containing $SiO_2$, or may be made of organic glass containing a transparent resin such as PMMA and PC. The sheet member 102 is, for example, an adhesive sheet containing a translucent adhesive agent.

The display module 1 is disposed on the −X side of the front cover 101 and the sheet member 102, and disposed on the +X side of the sheet member 103 and the rear cover 104. The display module 1 extends in the YZ-direction in a plate shape, and has a substantially rectangular shape, the longitudinal direction of which is the Y-direction. The display module 1 includes the display panels 11 and 12, and the display panels 11 and 12 are arranged side by side along the Y-direction. Each of the display panels 11 and 12 is, for example, a liquid crystal panel or an organic EL panel. The display module 1 performs two-screen display in accordance with a control signal from a controller (not illustrated) mounted on the circuit board 105.

The rear cover 104 is disposed on the −X side of the sheet member 103, and the sheet member 103 is disposed on the −X side of the display module 1. The rear cover 104 has the width in the Z-direction and the width in the Y-direction smaller than those of the front cover 101. The rear cover 104 has the width in the Z-direction and the width in the Y-direction larger than those of the display module 1. The rear cover 104 can house the front cover 101, the sheet member 102, the display module 1, and the sheet member 103. The rear cover 104 is stuck on a back surface of the display module 1 via the sheet member 103 to protect the back surface (a surface on the −X side) of the display module 1. The sheet member 102 is, for example, an adhesive sheet containing a translucent adhesive agent. The rear cover 104 is in thermal contact with an end part, on the −Y side, and an end part, on the +Y side, of the display module 1 via protecting members 25 and 26 (shown in FIG. 2) made of material having high thermal conductivity such as copper. Due to this, the rear cover 104 functions as a heat radiation member that receives heat transmitted from the display module 1 and radiates the heat into surrounding gas. The rear cover 104 is made of material having high rigidity and thermal conductivity such as aluminum.

The circuit board 105 is disposed on the −X side of the rear cover 104, extends in the YZ-direction in a plate shape, and has a substantially rectangular shape, the longitudinal direction of which is the Y-direction. The circuit board 105 has the width in the Z-direction and the width in the Y-direction smaller than those of the rear cover 104. The circuit board 105 is mounted on a back surface (a surface on the −X side) of the rear cover 104. A controller for controlling operation of the display module 1 is mounted on the circuit board 105. The controller is electrically connected to drive circuit elements 11*b* and 12*b* (refer to FIG. 2) of the respective display panels 11 and 12 via wiring of FPCs 105*a* and 105 of the circuit board 105, and wiring of a relay board (not illustrated).

The board cover 106 is disposed on the −X side of the circuit board 105, extends in the YZ-direction in a plate shape, and has a substantially rectangular shape, the longitudinal direction of which is the Y-direction. The board cover 106 has dimensions corresponding to the circuit board 105. The board cover 106 covers the circuit board 105 from the −X side to protect the circuit board 105.

The protective panel member 107 is disposed on the −X side of the circuit board 105, extends in the YZ-direction in a plate shape, and has a substantially rectangular shape, the longitudinal direction of which is the Y-direction. The protective panel member 107 has the width in the Z-direction and the width in the Y-direction larger than those of the front cover 101. The protective panel member 107 has the width in the Z-direction and the width in the Y-direction larger than those of the display module 1. The protective panel member 107 has the width in the Z-direction and the width in the Y-direction larger than those of the rear cover 104. The protective panel member 107 can house the front cover 101, the sheet member 102, the display module 1, the sheet member 103, the rear cover 104, the circuit board 105, and the board cover 106.

Figure 2:
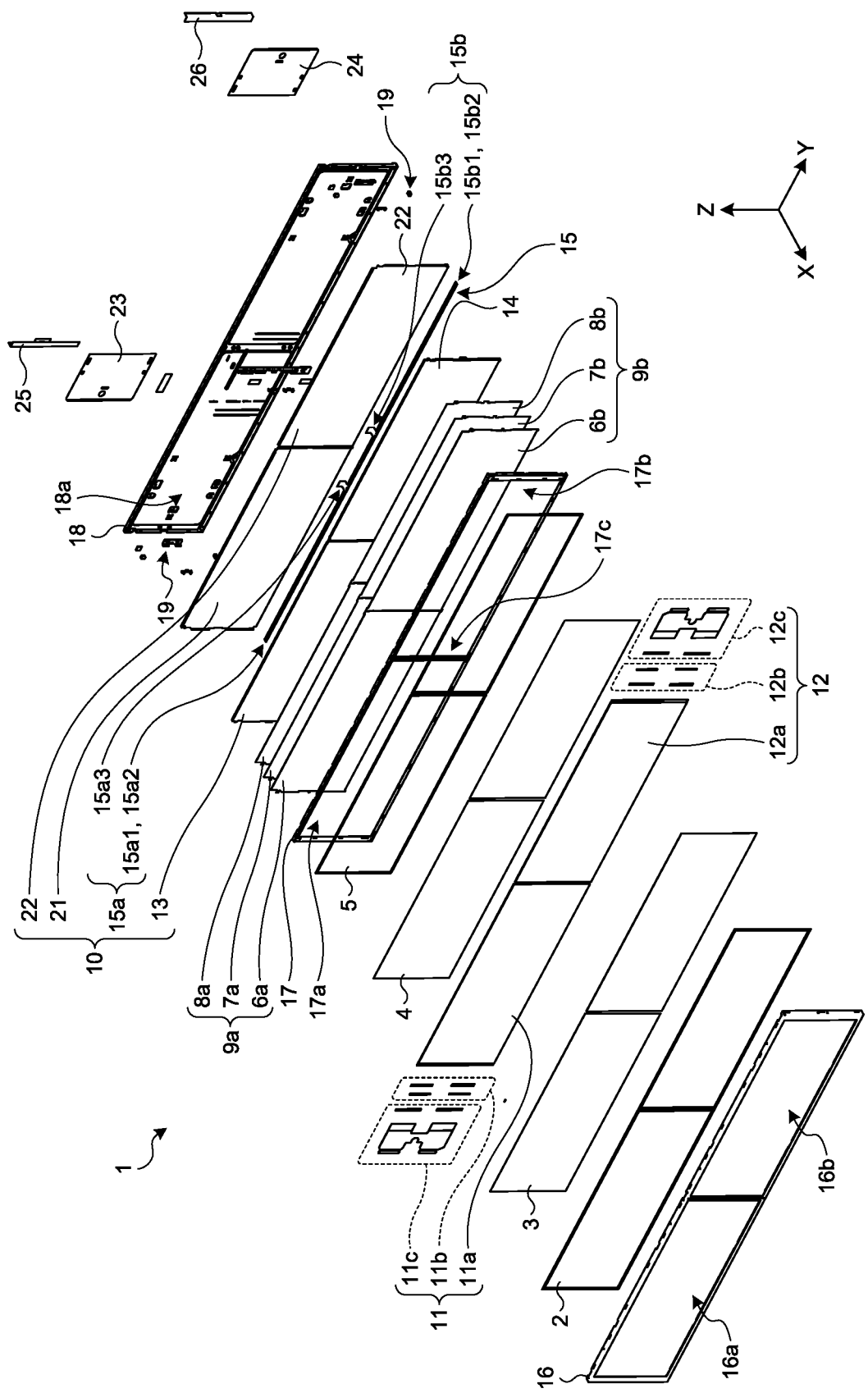
FIG. 2 is an exploded perspective view illustrating a configuration of the display module according to the embodiment.

In the vehicle-mounted member 100, the display module 1 may be configured as illustrated in FIG. 2, for example. FIG. 2 is an exploded perspective view illustrating a configuration of the display module 1.

The display module 1 includes a front frame member 16, adhesive tape 2, a front polarizing plate 3, the display panels 11 and 12, a rear polarizing plate 4, adhesive tape 5, a middle frame member 17, a plurality of optical sheets 9a and 9b, a backlight module 10, a rear frame member 18, a plurality of insulating sheets 23 and 24, the protecting members 25 and 26, and a fixing/positioning structure 19. The optical sheets 9a and 9b respectively include polarizing sheets 6a and 6b, prism sheets 7a and 7b, and diffusion sheets 8a and 8b. The backlight module 10 includes a plurality of light guide plates 13 and 14, a light emitting element 15, and a plurality of reflective plates 21 and 22.

The front frame member 16 is disposed on the +X side of the adhesive tape 2, and has an outer contour having a substantially rectangular shape, the longitudinal direction of which is the Y-direction. The front frame member 16 has a plurality of openings 16a and 16b corresponding to the display panels 11 and 12. The front frame member 16 may be formed from a plate member made of material having rigidity such as aluminum or steel by sheet metal work for narrowing a picture frame and reducing weight.

The front frame member 16 engages with the middle frame member 17 to hold the adhesive tape 2, the front polarizing plate 3, the display panels 11 and 12, the rear polarizing plate 4, and the adhesive tape 5. The front frame member 16 may be formed from a plate member made of material having rigidity such as aluminum by sheet metal work for narrowing a picture frame and reducing weight.

The adhesive tape 2 is disposed on the −X side of the front frame member 16, disposed on the +X side of the front polarizing plate 3, and has an outer contour having a substantially rectangular shape, the longitudinal direction of which is the Y-direction. The front frame member 16 and the front polarizing plate 3 are bonded to each other.

The front polarizing plate 3 is disposed on the −X side of the adhesive tape 2, disposed on the +X side of the display panels 11 and 12, extends in the YZ-direction in a plate shape, and has a substantially rectangular shape, the longitudinal direction of which is the Y-direction.

The display panels 11 and 12 are disposed on the −X side of the front polarizing plate 3, disposed on the +X side of the rear polarizing plate 4, extend in the YZ-direction in a plate shape, and have a substantially rectangular shape, the longitudinal direction of which is the Y-direction. The display panels 11 and 12 are arranged side by side along the Y-direction, and respectively include drive circuit elements 11b and 12b in the vicinity of outer end parts in the Y-direction.

The display panel 11 includes a panel main body 11a, the drive circuit element 11b, and a flexible printed circuit (FPC) 11c. The panel main body 11a includes a plurality of display elements arranged in the YZ-direction, and has a substantially rectangular shape, the longitudinal direction of which is the Y-direction. The drive circuit element 11b is a circuit element for driving the display elements, and disposed in the vicinity of a short side, on the −Y side, of the panel main body 11a. The drive circuit element 11b is implemented on the FPC 11c.

The display panel 12 includes a panel main body 12a, the drive circuit element 12b, and a flexible printed circuit (FPC) 12c. The panel main body 12a includes a plurality of display elements arranged in the YZ-direction, and has a substantially rectangular shape, the longitudinal direction of which is the Y-direction. The drive circuit element 12b is a circuit element for driving the display elements, and disposed in the vicinity of a short side, on the −Y side, of the panel main body 12a. The drive circuit element 12b is implemented on the FPC 12c.

The rear polarizing plate 4 is disposed on the −X side of the display panels 11 and 12, disposed on the +X side of the adhesive tape 5, extends in the YZ-direction in a plate shape, and has a substantially rectangular shape, the longitudinal direction of which is the Y-direction.

The adhesive tape 5 is disposed on the −X side of the rear polarizing plate 4, disposed on the +X side of the middle frame member 17, and has an outer contour having a substantially rectangular shape, the longitudinal direction of which is the Y-direction. The rear polarizing plate 4 and the middle frame member 17 are bonded to each other.

The middle frame member 17 is disposed on the −X side of the adhesive tape 5, disposed on the +X side of an optical sheet 9, and has an outer contour having a substantially rectangular shape, the longitudinal direction of which is the Y-direction. That is, the middle frame member 17 is disposed in back (on the −X side) of the display panels 11 and 12, and in front (on the +X side) of the light guide plates 13 and 14. The middle frame member 17 has a plurality of openings 17a and 17b corresponding to the display panels 11 and 12. The middle frame member 17 may be formed from a plate member made of material having rigidity such as aluminum by sheet metal work for narrowing a picture frame and reducing weight.

The middle frame member 17 engages with the front frame member 16 to hold the adhesive tape 2, the front polarizing plate 3, the display panels 11 and 12, the rear polarizing plate 4, and the adhesive tape 5.

The optical sheets 9a and 9b are disposed on the −X side of the middle frame member 17, and disposed on the +X side of the backlight module 10. In the optical sheets 9a and 9b, the polarizing sheets 6a and 6b, the prism sheets 7a and 7b, and the diffusion sheets 8a and 8b are disposed from the −X side toward the +X side in order, each extend in the YZ-direction in a plate shape, and each have a substantially rectangular shape, the longitudinal direction of which is the Y-direction. The polarizing sheets 6a and 6b are arranged side by side in the Y-direction. The prism sheets 7a and 7b are arranged side by side in the Y-direction. The diffusion sheets 8a and 8b are arranged side by side in the Y-direction.

The backlight module 10 is disposed on the −X side of the optical sheet 9, and disposed on the +X side of the rear frame member 18.

In the backlight module 10, the light guide plates 13 and 14 correspond to the display panels 11 and 12, and are disposed in back (on the −X side) of the display panels 11 and 12. The light emitting element 15 is disposed around the light guide plates 13 and 14. The light emitting element 15 is disposed under (on the −Z side of) the light guide plates 13 and 14, and extends along the longitudinal direction (Y-direction) of the light guide plates 13 and 14. The reflective plates 21 and 22 correspond to the light guide plates 13 and 14, and are disposed in back (on the −X side) of the light guide plates 13 and 14. In the light guide plates 13 and 14, a light incident surface (an end face on the −Z side) is a surface facing the light emitting element 15, a light reflecting surface (a surface on the −X side) is a surface facing the reflective plates 21 and 22, and a light emitting surface (a surface on the +X side) is a surface facing the display panels 11 and 12.

In the backlight module 10, the light emitting element 15 includes an element part 15a corresponding to the light guide plate 13 and an element part 15b corresponding to the light guide plate 14. The element part 15a includes a long-length board 15a1 extending in the Y-direction, a plurality of light emitting parts 15a2 that are mounted on the board 15a1 and arranged along the Y-direction, and an FPC 15a3 including wiring that supplies a signal to the light emitting part 15a2. The element part 15b includes a long-length board 15b1 extending in the Y-direction, a plurality of light emitting parts 15b2 that are mounted on the board 15b1 and arranged along the Y-direction, and an FPC 15b3 including wiring that supplies a signal to the light emitting part 15b2. The light emitting parts 15a2 and the light emitting parts 15b2 may be connected using zigzag wiring in which a plurality of serial connections are alternately connected in parallel. The light emitting parts 15a2 and the light emitting parts 15b2 may be electrically connected to each other.

The light emitting element 15 that may be a heat source is positioned at an end part on the −Z side of the display module 1, and the drive circuit elements 11b and 12b that may be other heat sources are positioned at an end part, on the +Y side, and an end part, on the −Y side, of the display module 1. Thus, in a case of viewing the entire display module 1, the heat sources are disposed in a distributed manner, and heat from the respective heat sources may be efficiently radiated.

The rear frame member 18 is disposed on the −X side of the optical sheets 9a and 9b, disposed on the −X side of the light guide plates 13 and 14, extends in the YZ-direction in a plate shape, and has an outer contour having a substantially rectangular shape, the longitudinal direction of which is the Y-direction. That is, the rear frame member 18 is disposed in back (on the −X side) of the optical sheets 9a and 9b and the light guide plates 13 and 14. The rear frame member 18 includes a housing 18a that houses the optical sheets 9a and 9b and the light guide plates 13 and 14. The housing 18a is a recessed part having a bottom surface that is recessed in the X-direction and extends in the YZ-direction in the rear frame member 18. The bottom surface of the housing 18a has dimensions and a shape corresponding to the optical sheets 9a and 9b and the light guide plates 13 and 14. In a view of the Y-Z plane, the bottom surface of the housing 18a extends in a plane shape in the YZ-direction, and has a substantially rectangular shape, the longitudinal direction of which is the Y-direction. The rear frame member 18 may be formed from a plate member made of material having rigidity such as aluminum or steel by sheet metal work for narrowing a picture frame and reducing weight.

The light emitting element 15 is disposed under (on the −Z side of) the light guide plates 13 and 14, so that upper (+Z side) portions of the rear frame member 18, the middle frame member 17, and the front frame member 16 can be easily narrowed.

The rear frame member 18 engages with the middle frame member 17 to hold the optical sheet 9 and the backlight module 10. The middle frame member 17 engaging with the rear frame member 18 further engages with the front frame member 16 to hold the adhesive tape 2, the front polarizing plate 3, the display panels 11 and 12, the rear polarizing plate 4, and the adhesive tape 5.

Figure 3A:
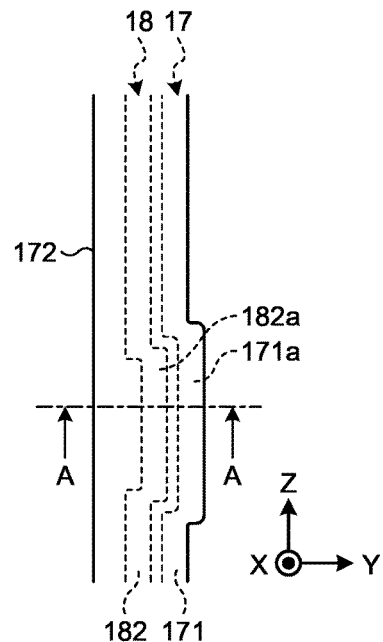
FIGS. 3A to 3D are plan views and cross-sectional views illustrating an engaging structure of a front frame, a middle frame, and a rear frame according to the embodiment.
Figure 3B:
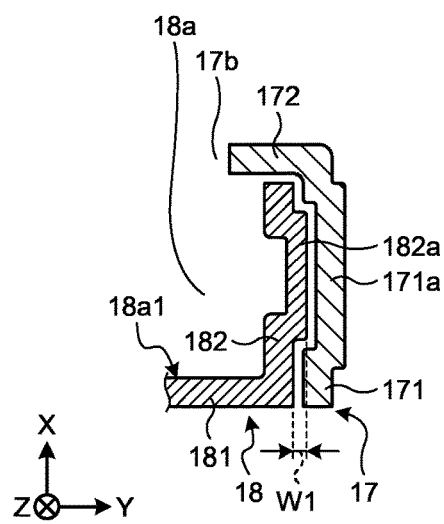

For example, the middle frame member 17 and the rear frame member 18 may have an engaging structure as illustrated in FIG. 3A and FIG. 3B. FIG. 3A is a plan view illustrating the engaging structure of the middle frame member 17 and the rear frame member 18, and exemplifies +Y side portions of the middle frame member 17 and the rear frame member 18 illustrated in FIG. 2. FIG. 3B is a cross-sectional view illustrating the engaging structure of the middle frame member 17 and the rear frame member 18, and illustrates a cross section in a case of cutting FIG. 3A along the line A-A.

As illustrated in FIG. 3B, the rear frame member 18 includes a bottom wall part 181 forming a bottom surface 18a1 of the housing 18a, and a side wall part 182 that is bent in the +X-direction at end parts, on the +Y side, the −Y side, the +Z side, and the −Z side, of the bottom wall part 181. FIG. 3A and FIG. 3B exemplify the side wall part 182 that is bent in the +X-direction at the +Y side of the bottom wall part 181. As illustrated in FIG. 3A and FIG. 3B, the middle frame member 17 includes a side wall part 171 as a principal part of the frame, and a flange part 172 that is bent toward a center side at an end part, on the +X side, of the side wall part 171. The flange part 172 defines the openings 17a and 17b. FIG. 3A and FIG. 3B exemplify the flange part 172 that is bent toward the −Y side at an end part, on the +X side, of the side wall part 171, on the +Y side, of the middle frame member 17.

On the side wall part 171 and the side wall part 182 that are opposed to each other when the middle frame member 17 engages with the rear frame member 18, a recessed part 171a and a projecting part 182a corresponding to each other are formed by drawing work and the like. The recessed part 171a is recessed in a direction in which the side wall part 171 partially gets away from the rear frame member 18 (in a case of FIG. 3A and FIG. 3B, toward the +Y side). The projecting part 182a projects in a direction in which the side wall part 182 partially gets close to the middle frame member 17 (in a case of FIG. 3A and FIG. 3B, toward the +Y side).

It is sufficient that structures that can engage with each other are disposed on the side wall part 171 and the side wall part 182. For example, a projecting part may be formed on the side wall part 171 in place of the recessed part 171a, and a recessed part may be formed on the side wall part 182 in place of the projecting part 182a. Drawing work may be performed on the recessed part 171a and the projecting part 182a at the same time. At this point, a projecting height W1 of the projecting part 182a is adjusted to be an appropriate height to achieve engagement with required strength. Due to this, clearance can be suppressed at the time of engagement of the recessed part 171a and the projecting part 182a, and wobbles of the middle frame member 17 and the rear frame member 18 mounted on a vehicle can be suppressed at the time when the vehicle is traveling.

Figure 3C:
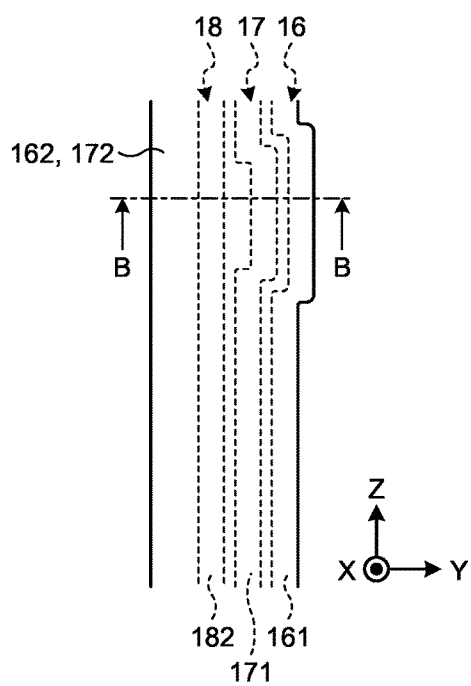
Figure 3D:
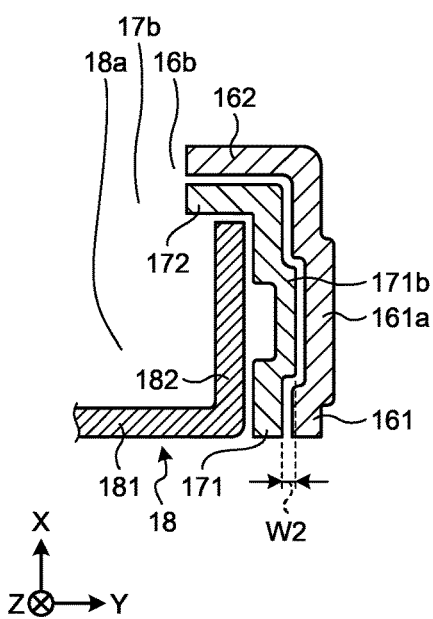

The front frame member 16 and the middle frame member 17 may have an engaging structure as illustrated in FIG. 3C and FIG. 3D. FIG. 3C is a plan view illustrating the engaging structure of the front frame member 16 and the middle frame member 17, and exemplifies +Y side portions of the front frame member 16 and the middle frame member 17 illustrated in FIG. 2. FIG. 3C exemplifies the middle frame member 17 engaging with the rear frame member 18, and illustrates a portion, on the +Y side, of the middle frame member 17 different from that in FIG. 3A. FIG. 3D is a cross-sectional view illustrating the engaging structure of the front frame member 16 and the middle frame member 17, and illustrates a cross section in a case of cutting FIG. 3D along the line B-B.

As illustrated in FIG. 3C and FIG. 3D, the front frame member 16 includes a side wall part 161 as a principal part of the frame, and a flange part 162 that is bent at an end part, on the +X side, of the side wall part 161 toward a center side. The flange part 162 defines the openings 16a and 16b. FIG. 3C and FIG. 3D exemplify the flange part 162 that is bent at an end part, on the +X side, of the side wall part 171, on the +Y side, of the front frame member 16 toward the −Y side.

On the side wall part 161 and the side wall part 171 that are opposed to each other when the front frame member 16 engages with the middle frame member 17, a recessed part 161a and a projecting part 171b corresponding to each other are formed by drawing work and the like. The recessed part 161a is recessed in a direction in which the side wall part 161 partially gets away from the middle frame member 17 (in a case of FIG. 3C and FIG. 3D, the +Y side). The projecting part 171b projects in a direction in which the side wall part 171 partially gets close to the front frame member 16 (in a case of FIG. 3C and FIG. 3D, the +Y side).

It is sufficient that structures that can engage with each other are disposed on the side wall part 161 and the side wall part 171. For example, a projecting part may be formed on the side wall part 161 in place of the recessed part 161a, and a recessed part may be formed on the side wall part 171 in place of the projecting part 171b. Drawing work may be performed on the recessed part 161a and the projecting part 171b at the same time. At this point, a projecting height W2 of the projecting part 171b is adjusted to be an appropriate height to achieve engagement with required strength. Due to this, clearance can be suppressed at the time of engagement of the recessed part 161a and the projecting part 171b, and wobbles of the front frame member 16 and the middle frame member 17 mounted on a vehicle can be suppressed at the time when the vehicle is traveling.

The height of the projecting part 182a is adjusted to be an appropriate height in the engaging structure of the middle frame member 17 and the rear frame member 18, and the height of the projecting part 171b is adjusted to be an appropriate height in the engaging structure of the front frame member 16 and the middle frame member 17. Due to this, the recessed part 171a and the projecting part 182a are assumed to have a one-to-one structure in the engaging structure of the middle frame member 17 and the rear frame member 18, and the recessed part 161a and the projecting part 171b are assumed to have a one-to-one structure in the engaging structure of the front frame member 16 and the middle frame member 17.

Figure 17:
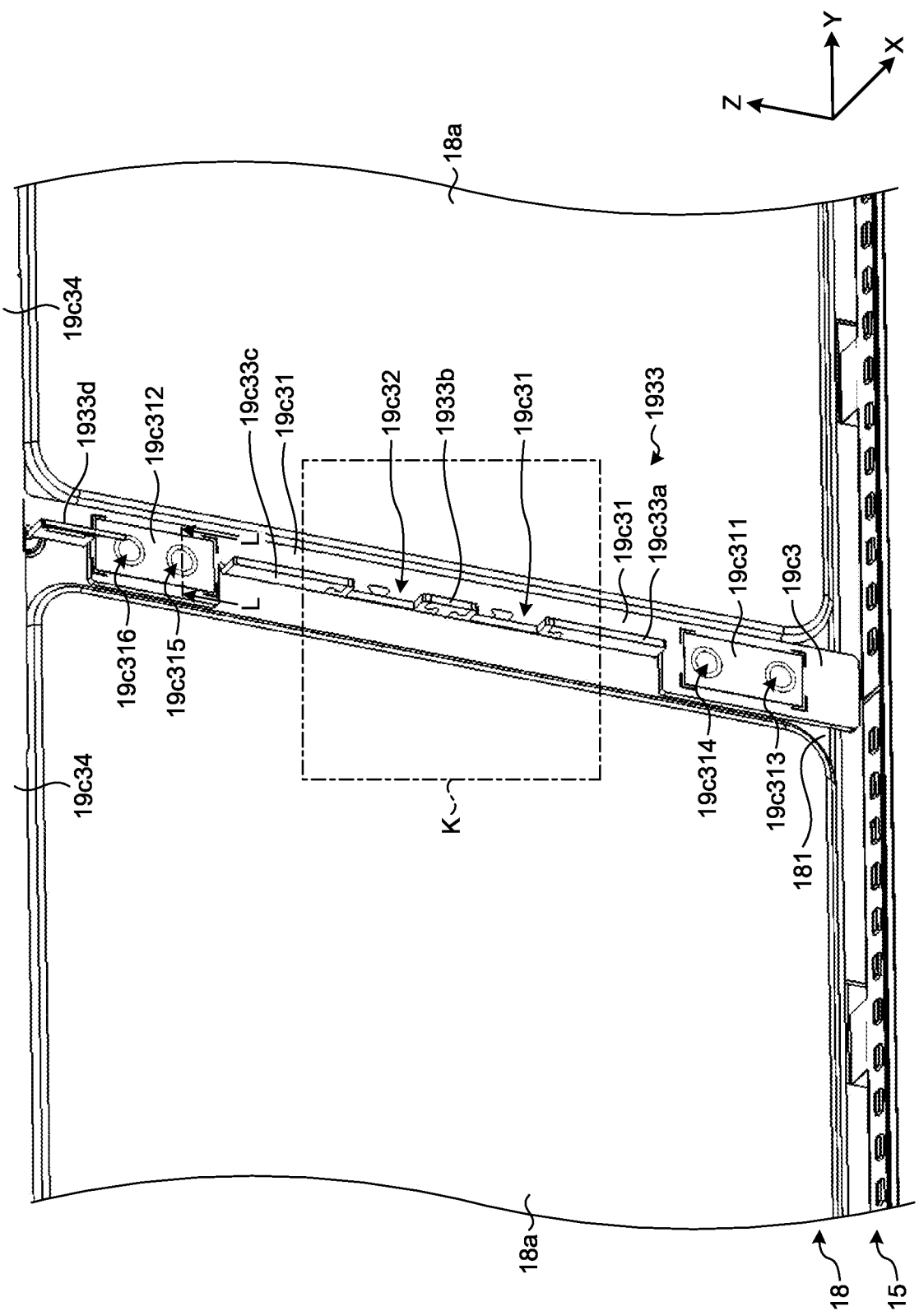
FIG. 17 is an enlarged perspective view illustrating the fixing/positioning structure according to the embodiment.

The rear frame member 18 illustrated in FIG. 2 is in thermal contact with the light emitting element 15 that may be a heat source (refer to FIG. 17). Due to this, the rear frame member 18 functions as a heat radiation member that receives heat transmitted from the light emitting element 15 and radiates the heat into surrounding gas. The rear frame member 18 is made of material having high rigidity and thermal conductivity such as aluminum.

The light emitting element 15 is disposed under (on the −Z side of) the rear frame member 18, so that heat from the light emitting element 15 tends to move upward, and heat from the light emitting element 15 may be efficiently transmitted to the rear frame member 18.

The insulating sheets 23 and 24 are disposed on the −X side of the rear frame member 18, and disposed on the +X side of a plurality of relay boards (not illustrated). Each of the insulating sheets 23 and 24 has a shape corresponding to the relay board, and has a substantially rectangular shape, the longitudinal direction of which is the Z-direction. The relay boards are boards that relay electrical connection between the FPCs 105a and 105b of the circuit board 105 and the drive circuit elements 11b and 12b of the display panels 11 and 12. The insulating sheets 23 and 24 are interposed between the rear frame member 18 and the relay boards to electrically insulate the relay boards from the rear frame member 18.

The protecting members 25 and 26 are disposed on the −X side of the insulating sheets 23 and 24, and disposed on the +X side of the rear cover 104. The protecting members 25 and 26 bring the rear frame member 18 and/or the relay board into thermal contact with the rear cover 104. Due to this, the protecting members 25 and 26 function as heat transmission members that transmit heat from the rear frame member 18 and/or the relay board to the rear cover 104. The protecting members 25 and 26 are made of material having high rigidity and thermal conductivity such as copper.

The fixing/positioning structure 19 is a structure for fixing or positioning the light guide plates 13 and 14 to the housing 18a. The fixing/positioning structure 19 includes a structure in which an elastic member pushes the light guide plates 13 and 14 against an inner wall of the housing 18a. The fixing/positioning structure 19 includes a structure in which an elastic member is interposed between the housing 18a and the light guide plates 13 and 14 at a corner part and a central upper part of the housing 18a. Due to this, the fixing/positioning structure 19 can fix the light guide plates 13 and 14 to the housing 18a.

Figure 4:
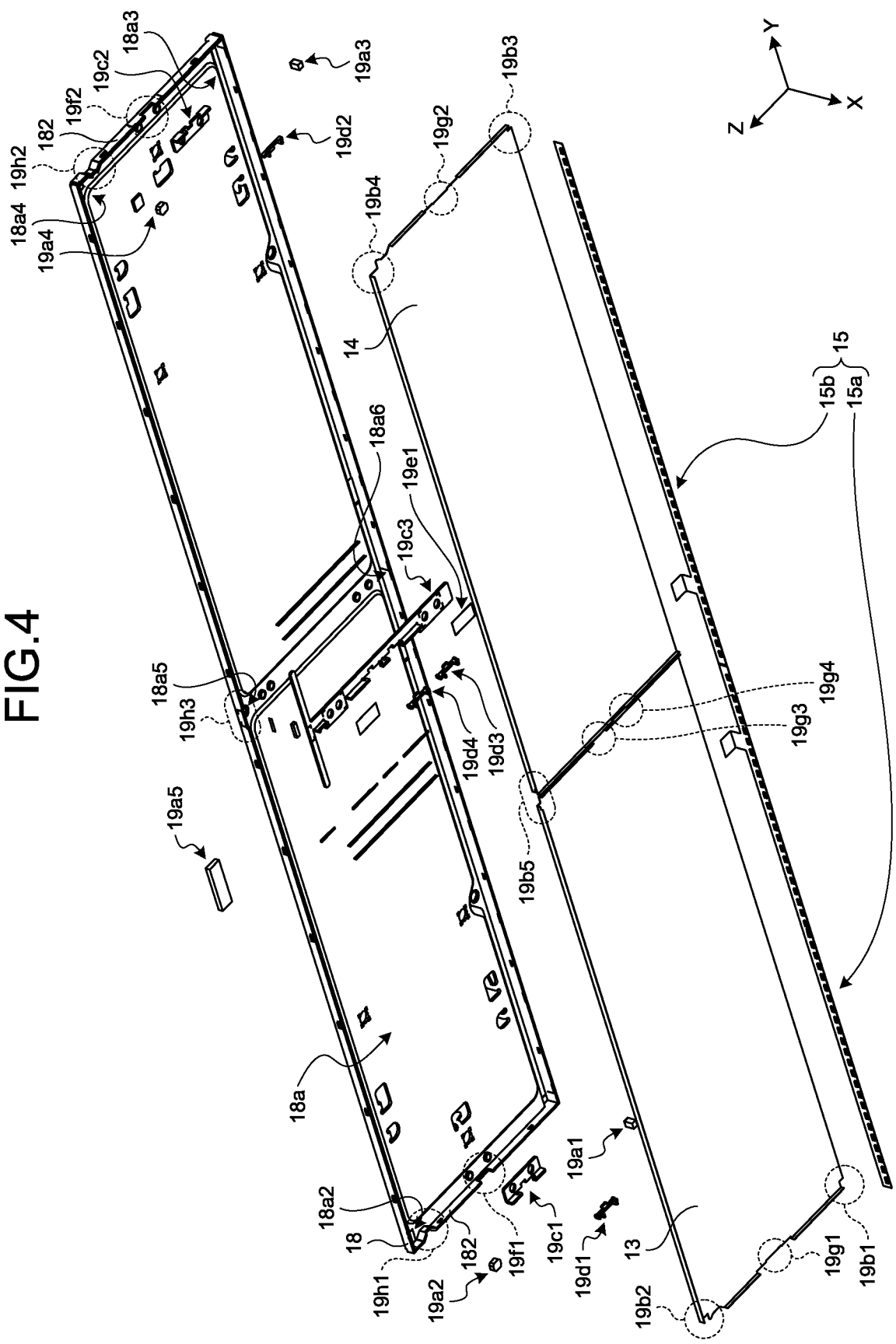
FIG. 4 is an exploded perspective view illustrating a plurality of light guide plates, a light emitting element, a rear frame member, and a fixing/positioning structure according to the embodiment.

For example, as illustrated in FIG. 4, elastic members 19a1, 19a2, 19a3, 19a4, and 19a5 are respectively disposed at a corner part 18a1, on the −Y side/−Z side, a corner part 18a2, on the −Y side/+Z side, a corner part 18a3, on the +Y side/−Z side, a corner part 18a4, on the +Y side/+Z side, and a portion 18a5, on the +Z side at the center in the Y-direction, of the housing 18a. Each of the elastic members 19a1, 19a2, 19a3, 19a4, and 19a5 may be made of material having elasticity such as rubber.

Notches 19b1 and 19b2 corresponding to the elastic members 19a1 and 19a2 are respectively disposed in the vicinity of a corner, on the −Y side/−Z side, and in the vicinity of a corner, on the −Y side/+Z side, of the light guide plate 13. Notches 19b3 and 19b4 corresponding to the elastic members 19a3 and 19a4 are respectively disposed in the vicinity of a corner, on the +Y side/−Z side, and in the vicinity of a corner, on the +Y side/+Z side, of the light guide plate 14. A notch 19b5 corresponding to the elastic member 19a5 is disposed in the vicinity of a corner, on the +Y side/+Z side, of the light guide plate 13, and in the vicinity of a corner, on the −Y side/+Z side, of the light guide plate 14.

Figure 5:
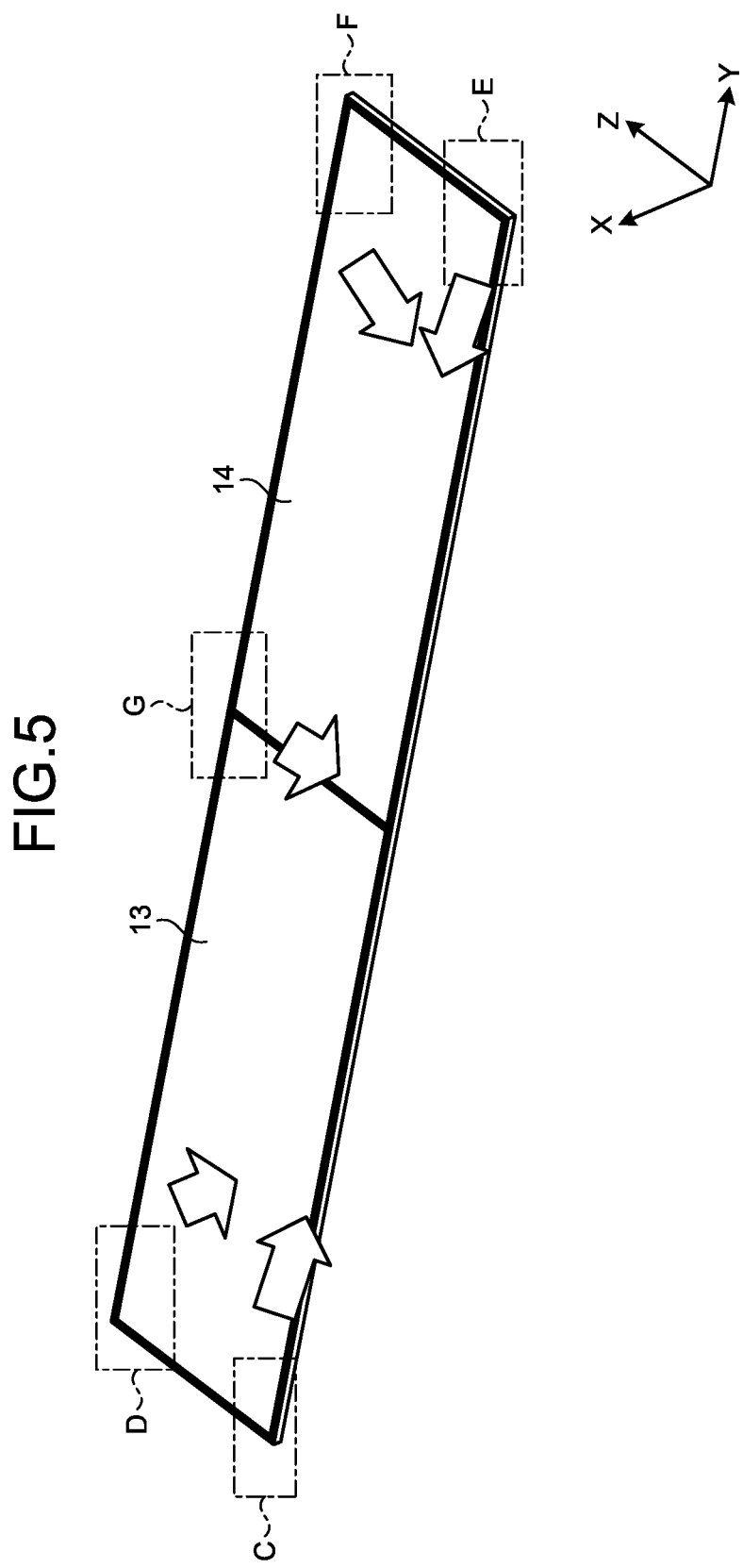
FIG. 5 is a perspective view illustrating a state in which the light guide plates are fixed by the fixing/positioning structure according to the embodiment.

Due to this, as represented by a solid-white arrow in FIG. 5, at the time when the light guide plates 13 and 14 are housed in the housing 18a of the rear frame member 18, the elastic members 19a1, 19a2, 19a3, 19a4, and 19a5 can push the light guide plates 13 and 14 against an inner wall of a central lower part 18a6 (refer to FIG. 4) of the housing 18a.

Due to this, the fixing/positioning structure 19 can fix the light guide plates 13 and 14 to the housing 18a. The elastic member 19a5 is shared by the light guide plates 13 and 14 for fixing.

Figure 6:
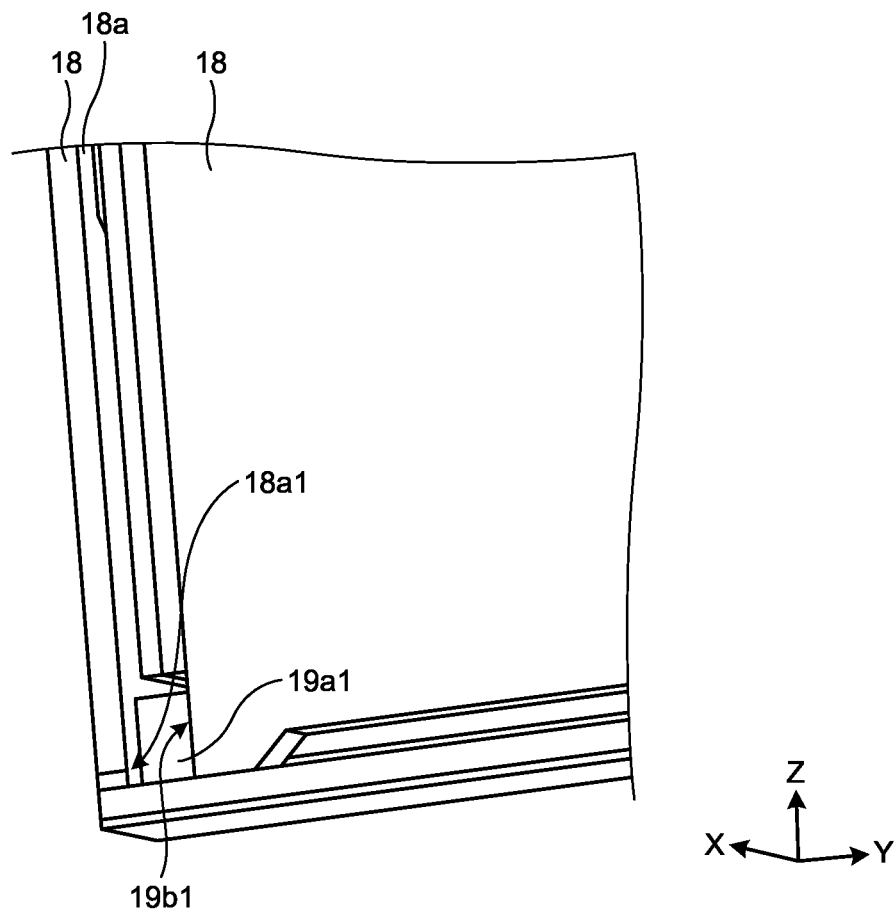
FIG. 6 is an enlarged perspective view illustrating the light guide plate and the fixing/positioning structure according to the embodiment.

At the corner part 18a1, on the −Y side/−Z side, of the housing 18a, as illustrated in FIG. 6, the elastic member 19a1 is interposed between the inner wall of the housing 18a and the notch 19b1 in the vicinity of the corner, on the −Y side/−Z side, of the light guide plate 13. FIG. 6 is an enlarged perspective view illustrating the light guide plate and the fixing/positioning structure, and is a perspective view obtained by enlarging a portion C in FIG. 5. The elastic member 19a1 has a substantially rectangular column shape, side surfaces, on the −Z side and the −Y side, of the rectangular column abut on the inner wall of the housing 18a, and side surfaces, on the +Z side and the +Y side, of the rectangular column abut on an end face of the notch 19b1 of the light guide plate 13. Due to this, the elastic member 19a1 can push the light guide plate 13 toward the +Y side.

Figure 7:
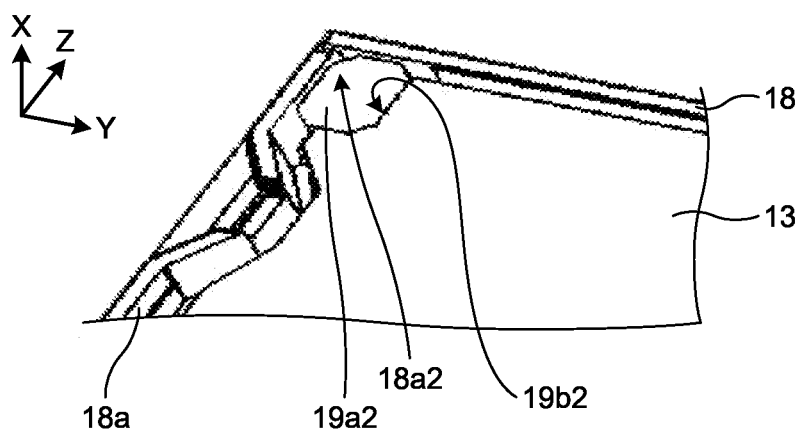
FIG. 7 is an enlarged perspective view illustrating the light guide plate and the fixing/positioning structure according to the embodiment.

At the corner part 18a2, on the −Y side/+Z side, of the housing 18a, as illustrated in FIG. 7, the elastic member 19a2 is interposed between the inner wall of the housing 18a and the notch 19b2 in the vicinity of the corner, on the −Y side/+Z side, of the light guide plate 13. FIG. 7 is an enlarged perspective view illustrating the light guide plate and the fixing/positioning structure, and is a perspective view obtained by enlarging a portion D in FIG. 5. The elastic member 19a2 has a substantially rectangular column shape, side surfaces, on the +Z side and the −Y side, of the rectangular column abut on the inner wall of the housing 18a, and side surfaces, on the −Z side and +Y side, of the rectangular column abut on an end face of the notch 19b2 of the light guide plate 13. Due to this, the elastic member 19a2 can push the light guide plate 13 toward the +Y side/−Z side.

Figure 8:
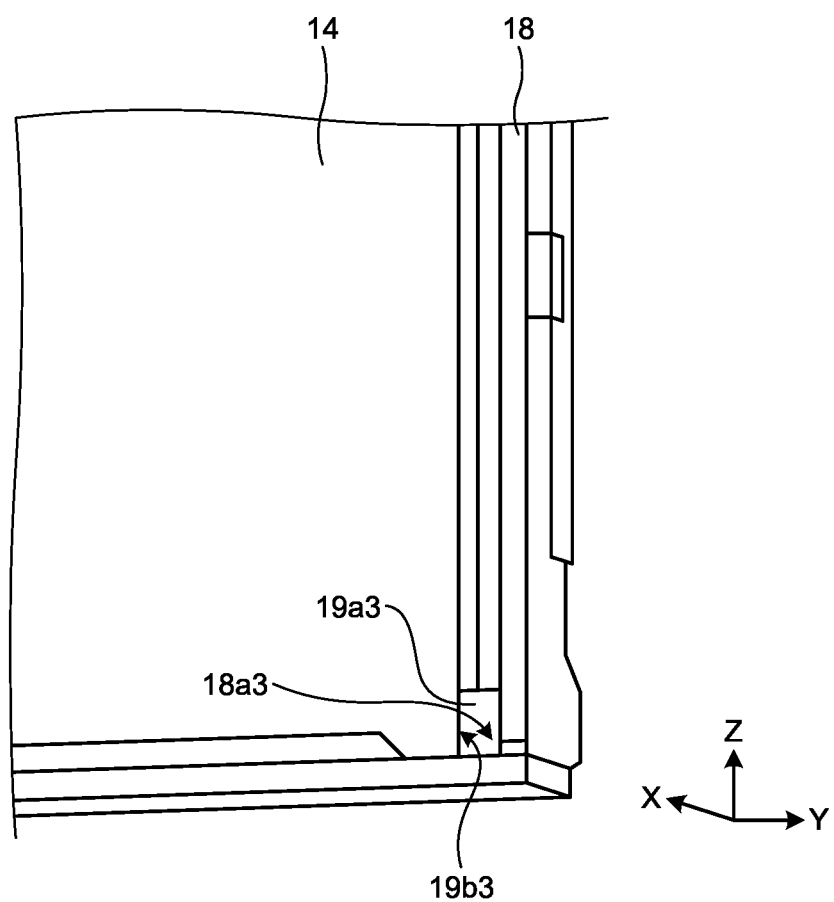
FIG. 8 is an enlarged perspective view illustrating the light guide plate and the fixing/positioning structure according to the embodiment.

At the corner part 18a3, on the +Y side/−Z side, of the housing 18a, as illustrated in FIG. 8, the elastic member 19a3 is interposed between the inner wall of the housing 18a and the notch 19b3 in the vicinity of the corner, on the −Y side/+Z side, of the light guide plate 14. FIG. 8 is an enlarged perspective view illustrating the light guide plate and the fixing/positioning structure, and is a perspective view obtained by enlarging a portion E in FIG. 5. The elastic member 19a3 has a substantially rectangular column shape, side surfaces, on the −Z side and the +Y side, of the rectangular column abut on the inner wall of the housing 18a, and side surfaces, on the +Z side and the −Y side, of the rectangular column abut on an end face of the notch 19b3 of the light guide plate 14. Due to this, the elastic member 19a3 can push the light guide plate 14 toward the −Y side.

Figure 9:
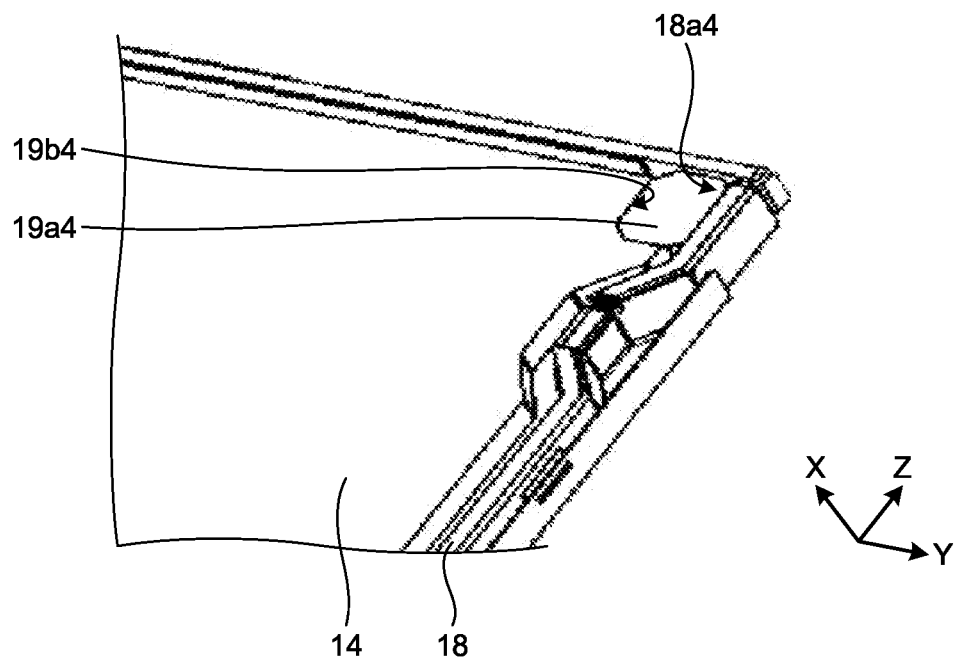
FIG. 9 is an enlarged perspective view illustrating the light guide plate and the fixing/positioning structure according to the embodiment.

At the corner part 18a4, on the +Y side/+Z side, of the housing 18a, as illustrated in FIG. 9, the elastic member 19a4 is interposed between the inner wall of the housing 18a and the notch 19b4 in the vicinity of the corner, on the +Y side/+Z side, of the light guide plate 14. FIG. 9 is an enlarged perspective view illustrating the light guide plate and the fixing/positioning structure, and is a perspective view obtained by enlarging a portion F in FIG. 5. The elastic member 19a4 has a substantially rectangular column shape, side surfaces, on the +Z side and the +Y side, of the rectangular column abut on the inner wall of the housing 18a, and side surfaces, on the −Z side and the −Y side, of the rectangular column abut on an end face of the notch 19b4 of the light guide plate 14. Due to this, the elastic member 19a4 can push the light guide plate 14 toward the −Y side/−Z side.

Figure 10:
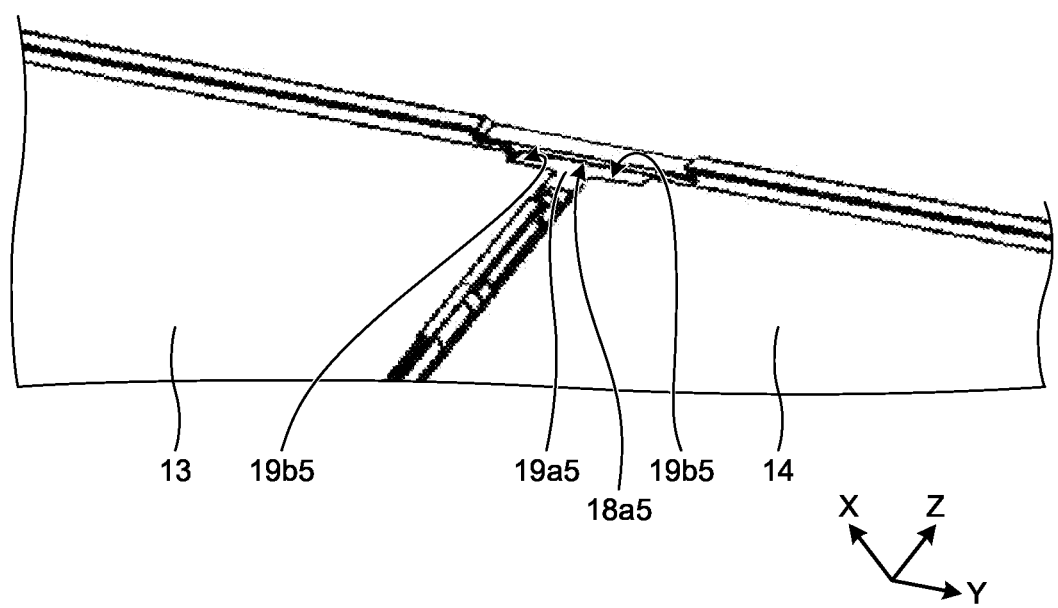
FIG. 10 is an enlarged perspective view illustrating the light guide plate and the fixing/positioning structure according to the embodiment.

At the portion 18a5, on the +Z side at the center in the Y-direction, of the housing 18a, as illustrated in FIG. 10, the elastic member 19a5 is interposed among the inner wall of the housing 18a, the notch 19b5 in the vicinity of the corner, on the +Y side/+Z side, of the light guide plate 13, and the notch 19b5 in the vicinity of the corner, on the −Y side/+Z side, of the light guide plate 14. FIG. 10 is an enlarged perspective view illustrating the light guide plate and the fixing/positioning structure, and is a perspective view obtained by enlarging a portion G in FIG. 5. The elastic member 19a5 has a substantially rectangular column shape including a long rectangular bottom surface extending in the Y-direction. In the elastic member 19a5, a side surface, on the +Z side, of the rectangular column abuts on the inner wall of the housing 18a, side surfaces, on the −Z side and the −Y side, of the rectangular column abut on an end face of the notch 19b5 of the light guide plate 13, and side surfaces, on the −Z side and the +Y side, of the rectangular column abut on an end face of the notch 19b5 of the light guide plate 14. Due to this, the elastic member 19a4 can push the light guide plate 14 toward the −Z side.

The fixing/positioning structure 19 illustrated in FIG. 2 includes a structure in which end parts of the light guide plates 13 and 14 engage with end parts or a center part of the housing 18a. The fixing/positioning structure 19 includes a structure in which projecting parts disposed at the end parts of the light guide plates 13 and 14 engage with recessed parts disposed at the end parts or the center part of the housing 18a. Due to this, the fixing/positioning structure 19 can position the light guide plates 13 and 14 with respect to the housing 18a.

For example, as illustrated in FIG. 4, notches 19f1 and 19f2 are disposed in the vicinity of the center, in the Z-direction, of side wall parts 182, on the −Y side and the +Y side, of the rear frame member 18.

Side members 19c1 and 19c2 are disposed in the vicinity of the notches 19f1 and 19f2 in the housing 18a, and a center member 19c3 is disposed in the vicinity of the center in the Y-direction in the housing 18a. Side molds 19d1 and 19d2 are disposed in the vicinity of the notches 19f1 and 19f2 in the housing 18a, and center molds 19d3 and 19d4 are disposed in the vicinity of the center in the Y-direction in the housing 18a.

Each of the side members 19c1 and 19c2 has a substantially I-shape in a ZY-plane view, has a substantially L-shape in an XY-side view, and has a substantially U-shape in an XZ-side view. The side molds 19d1 and 19d2 are embedded in U-shaped recessed portions of the side members 19c1 and 19c2. The side members 19c1 and 19c2 may be made of material containing metal as a principal component such as aluminum. The side molds 19d1 and 19d2 may be made of material containing a resin having thermoplasticity as a principal component. The recessed portions of the side members 19c1 and 19c2 in which the side molds 19d1 and 19d2 are embedded and the notches 19f1 and 19f2 form recessed parts.

The center member 19c3 has a substantially T-shape in a ZY-plane view, a longitudinal bar portion of the T-shape extends in the Z-direction to have a length from the vicinity of the inner wall, on the −Z side, to the vicinity of the inner wall, on the +Z side, of the housing 18a, and a lateral bar portion of the T-shape extends in the Y-direction along the inner wall in the vicinity of the center in the Y-direction in the housing 18a. The center member 19c3 has a shape in which a substantially I-shape is coupled onto a substantially lateral I-shape in an XY-side view. The center member 19c3 has a shape in which a substantially W-shape is coupled onto a substantially lateral I-shape in an XZ-side view. The center member 19c3 is formed by sheet metal work, has a portion that is bent toward the +X side in the vicinity of the center part, and two notches 19c31 and 19c32 that are arranged side by side in the Z-direction are disposed at the bent portion. The center molds 19d3 and 19d4 are embedded in the notches 19c31 and 19c32. The center member 19c3 may be made of material containing metal as a principal component such as aluminum. The center molds 19d3 and 19d4 may be made of material containing a resin having thermoplasticity as a principal component. Two recessed portions of the center member 19c3 in which the center molds 19d3 and 19d4 are embedded respectively form recessed parts.

In the vicinity of the center, in the Z-direction on the −Y side, of the light guide plate 13, and in the vicinity of the center, in the Z-direction on the +Y side, of the light guide plate 14, projections 19g1 and 19g2 corresponding to the notches 19f1 and 19f2, the side members 19c1 and 19c2, and the side molds 19d1 and 19d2 are respectively disposed. The projections 19g1 and 19g2 respectively form projecting parts. In the vicinity of the center, in the Z-direction on the +Y side, of the light guide plate 13, and in the vicinity of the center, in the Z-direction on the −Y side, of the light guide plate 14, projections 19g3 and 19g4 corresponding to the notches 19c31 and 19c32 and the center molds 19d3 and 19d4 are respectively disposed. The projections 19g3 and 19g4 respectively form projecting parts.

Figure 11:
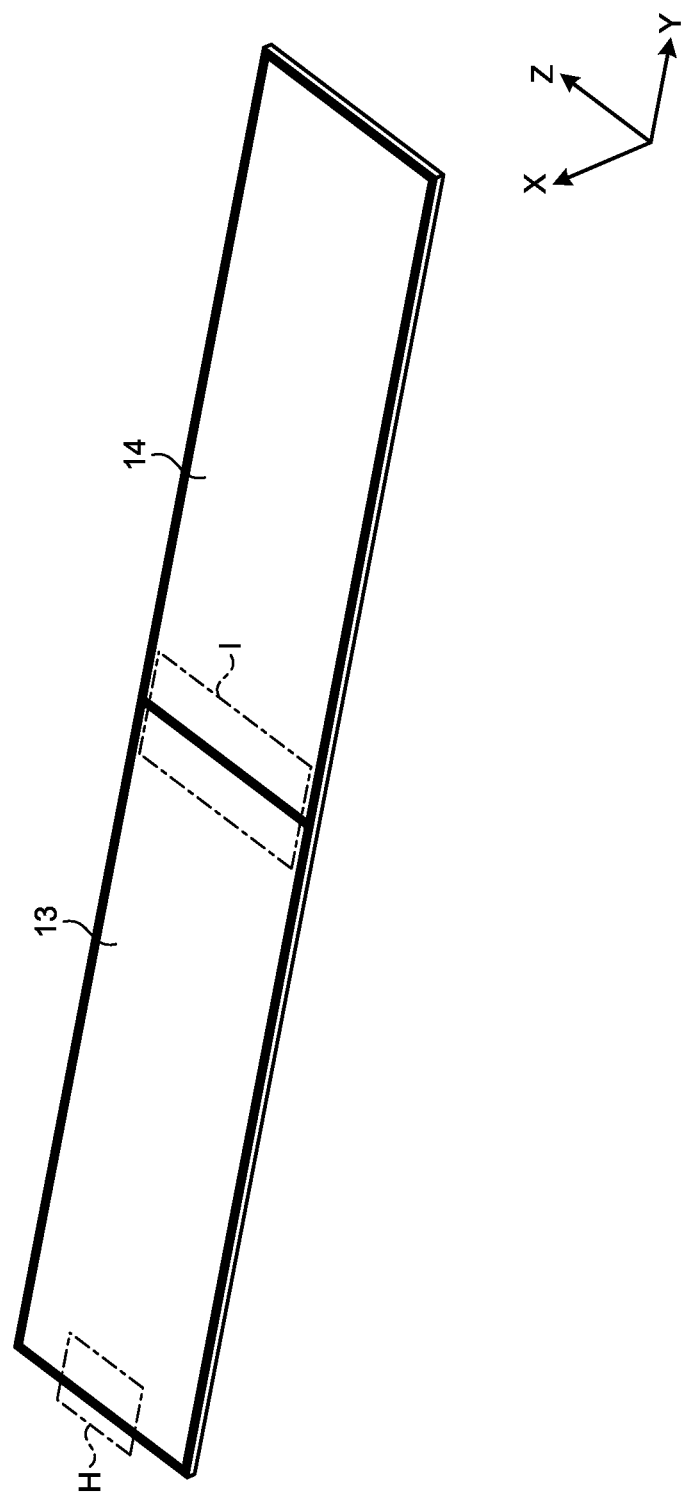
FIG. 11 is a perspective view illustrating a state in which the light guide plates are positioned by the fixing/positioning structure according to the embodiment.

Accordingly, as illustrated in FIG. 11, at the time when the light guide plates 13 and 14 are housed in the housing 18a of the rear frame member 18, the projections 19g1 and 19g2 disposed at the end parts of the light guide plates 13 and 14 engage with the recessed portions of the side members 19c1 and 19c2 in which the side molds 19d1 and 19d2 are embedded and the notches 19f1 and 19f2 that are disposed at the end parts of the housing 18a. At the time when the light guide plates 13 and 14 are housed in the housing 18a of the rear frame member 18, the projections 19g3 and 19g4 disposed at the end parts of the light guide plates 13 and 14 engage with the two recessed portions of the center member 19c3 in which the center molds 19d3 and 19d4 are embedded that are disposed at the center part of the housing 18a. Due to this, the fixing/positioning structure 19 can position the light guide plates 13 and 14 with respect to the housing 18a.

Figure 12:
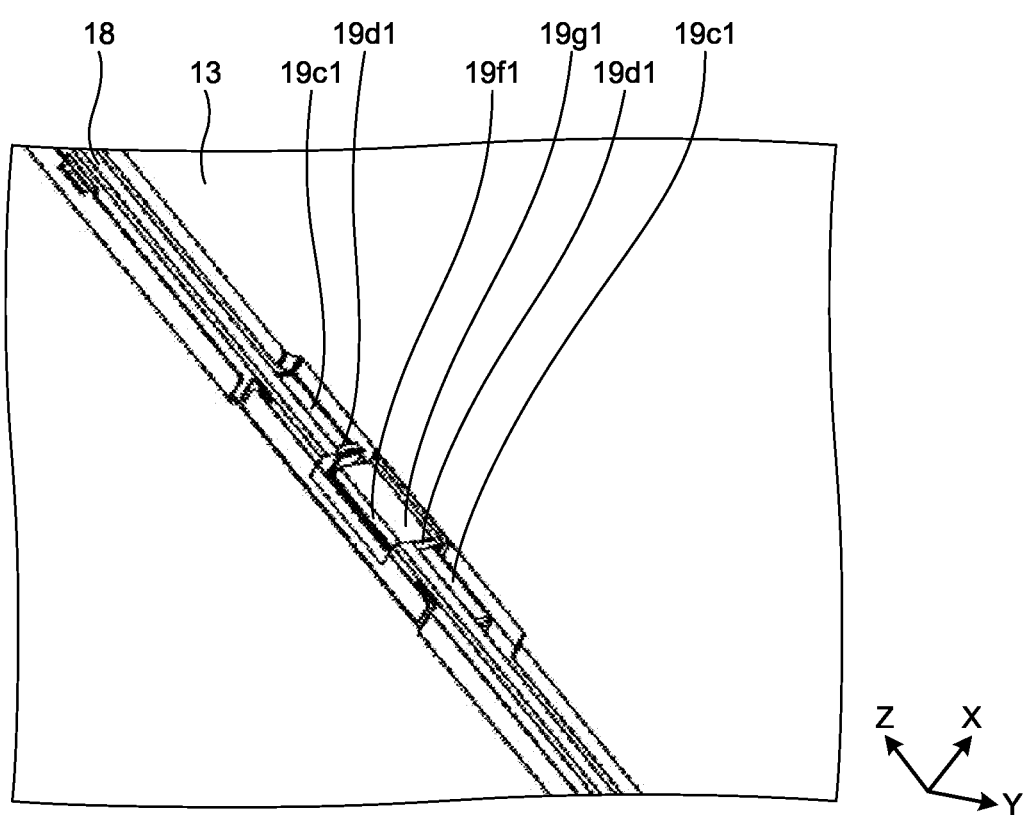
FIG. 12 is an enlarged perspective view illustrating the light guide plate and the fixing/positioning structure according to the embodiment.

In the vicinity of the center, in the Z-direction on the −Y side, of the housing 18a, as illustrated in FIG. 12, the projection 19g1 of the light guide plate 13 engages with the notch 19f1 and the recessed portion of the side member 19c1 in which the side mold 19d1 is embedded. FIG. 12 is an enlarged perspective view illustrating the light guide plate and the fixing/positioning structure, and is a perspective view obtained by enlarging a portion H in FIG. 11. The projection 19g1 projects in the −Y-direction from an end face, on the −Y side, of the light guide plate 13. The projection 19g1 has a plate shape extending in the YZ-direction, and a principal surface, on the −X side, and end faces, on the +Z side/−Z side, of the plate may abut on the notch 19f1 and the side mold 19d1. Due to the engagement between the projection 19g1, and the notch 19f1, the side mold 19d1, and the side member 19c1, the light guide plate 13 can be positioned with respect to the housing 18a.

Figure 13:
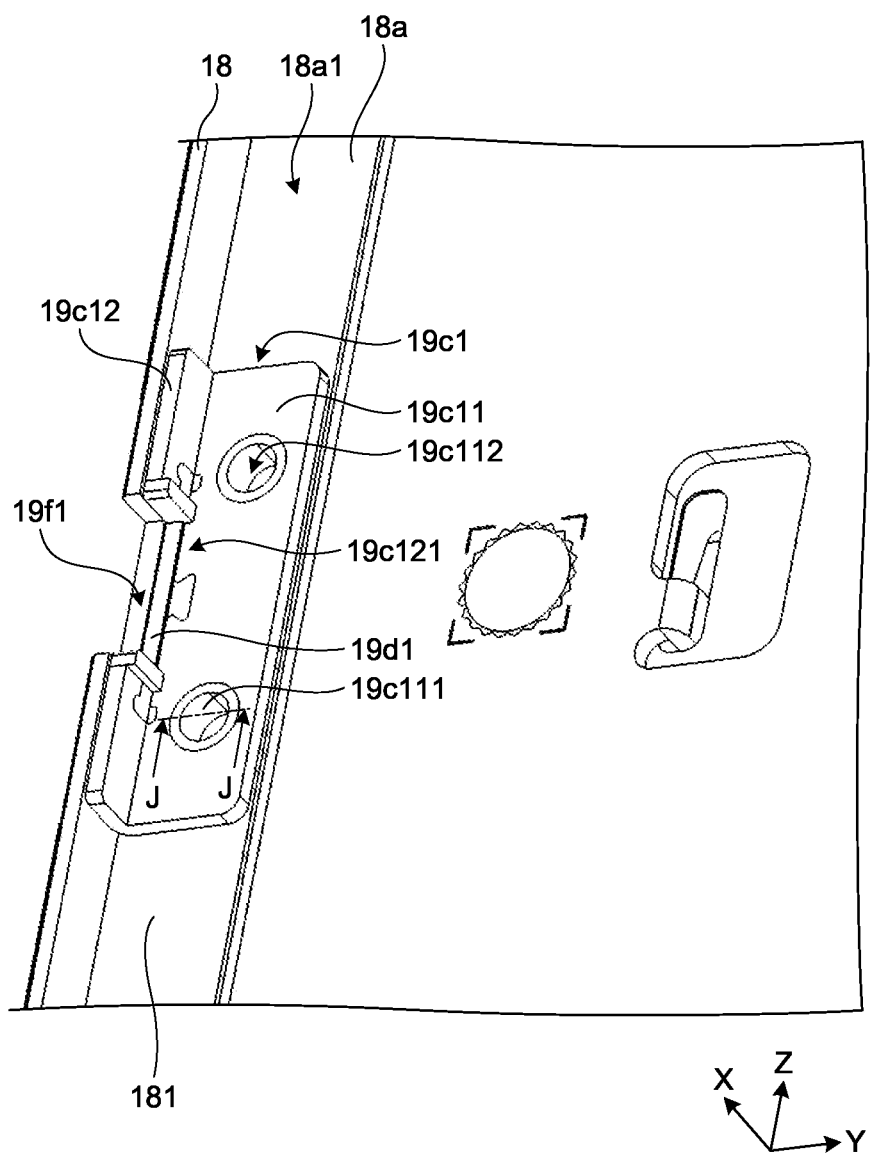
FIG. 13 is an enlarged perspective view illustrating the fixing/positioning structure according to the embodiment.

FIG. 13 is obtained by removing the light guide plate 13 and the projection 19g1, and further enlarging the recessed portion of the side member 19c1 in which the side mold 19d1 is embedded. FIG. 13 is an enlarged perspective view illustrating the fixing/positioning structure. The side member 19c1 includes a base part 19c11 extending in the ZY-direction in a plate shape having the Z-direction as a longitudinal direction, and a rising part 19c12 rising in the +X-direction from an end part, on the −Y side, of the base part 19c11. A notch 19c121 corresponding to the notch 19f1 is disposed on the rising part 19c12. A groove structure in which the side mold 19d1 is embedded is formed on the notch 19c121. The side mold 19d1 is embedded in the groove structure by injection molding and the like using the groove structure as part of a mold, and forms side surfaces, on the +Z side/−Z side, and a bottom surface, on the −X side, of a recessed part. Dimensions of the recessed part formed by the side mold 19d1 (for example, a width in the Z-direction and a depth in the X-direction) may be slightly smaller than dimensions of the recessed part formed by the notch 19f1. Hardness of a surface of the side mold 19d1 is smaller than that of the side member 19c1 and the rear frame member 18. Due to this, at the time when the light guide plates 13 are housed in the housing 18a of the rear frame member 18, the projection 19g1 and a peripheral part thereof tend to be preferentially brought into contact with the side mold 19d1, and the projection 19g1 and the peripheral part thereof can be prevented from being shaved or damaged.

The side member 19c1 is fastened to the bottom wall part 181 of the rear frame member 18 by caulking work. A plurality of openings 19c111 and 19c112 are disposed on the base part 19c11 of the side member 19c1, and side walls of the respective openings 19c111 and 19c112 are fixed to the bottom wall part 181 of the rear frame member 18 by caulking work.

Figure 14:
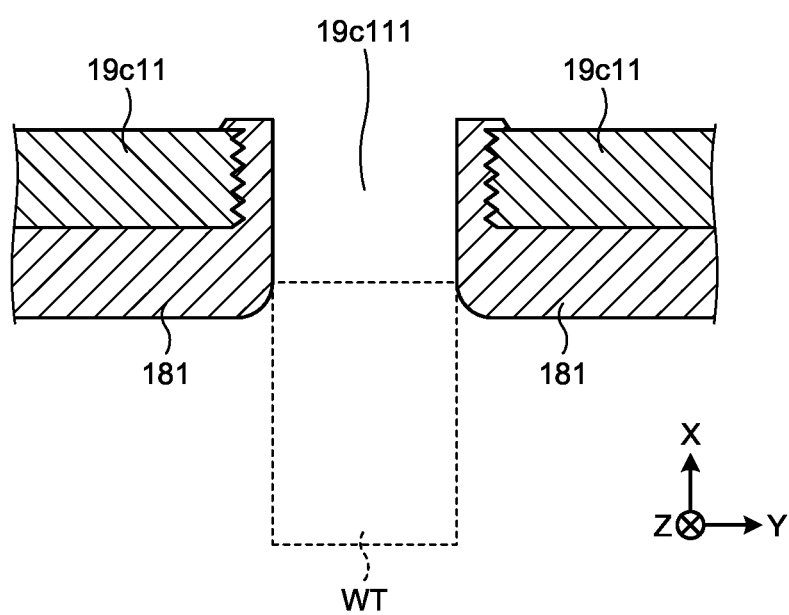
FIG. 14 is a cross-sectional view illustrating a caulking part according to the embodiment.

For example, a cross section obtained by cutting the vicinity of the opening 19c111 in FIG. 13 along the line J-J is illustrated in FIG. 14. FIG. 14 is a cross-sectional view illustrating a caulking part. An end face of the base part 19c11 constituting a side wall of the opening 19c111 is a rough surface having surface roughness in some degree as illustrated in FIG. 14. When a working tool WT is disposed at a position corresponding to the opening 19c111, on the −X side, of the bottom wall part 181, and the working tool WT is pushed out toward the +X side, part of the bottom wall part 181 is bent toward the +X side, and pushed against the rough surface of the side wall of the opening 19c111 to become a rough surface. Due to this, the rough surface of the side wall of the opening 19c111 and the rough surface of the bent part of the bottom wall part 181 engage with and are fixed to each other.

Due to this, the number of components for fastening between the side member 19c1 and the rear frame member 18 can be reduced, and the side member 19c1 and the rear frame member 18 can be easily thinned.

Figure 15:
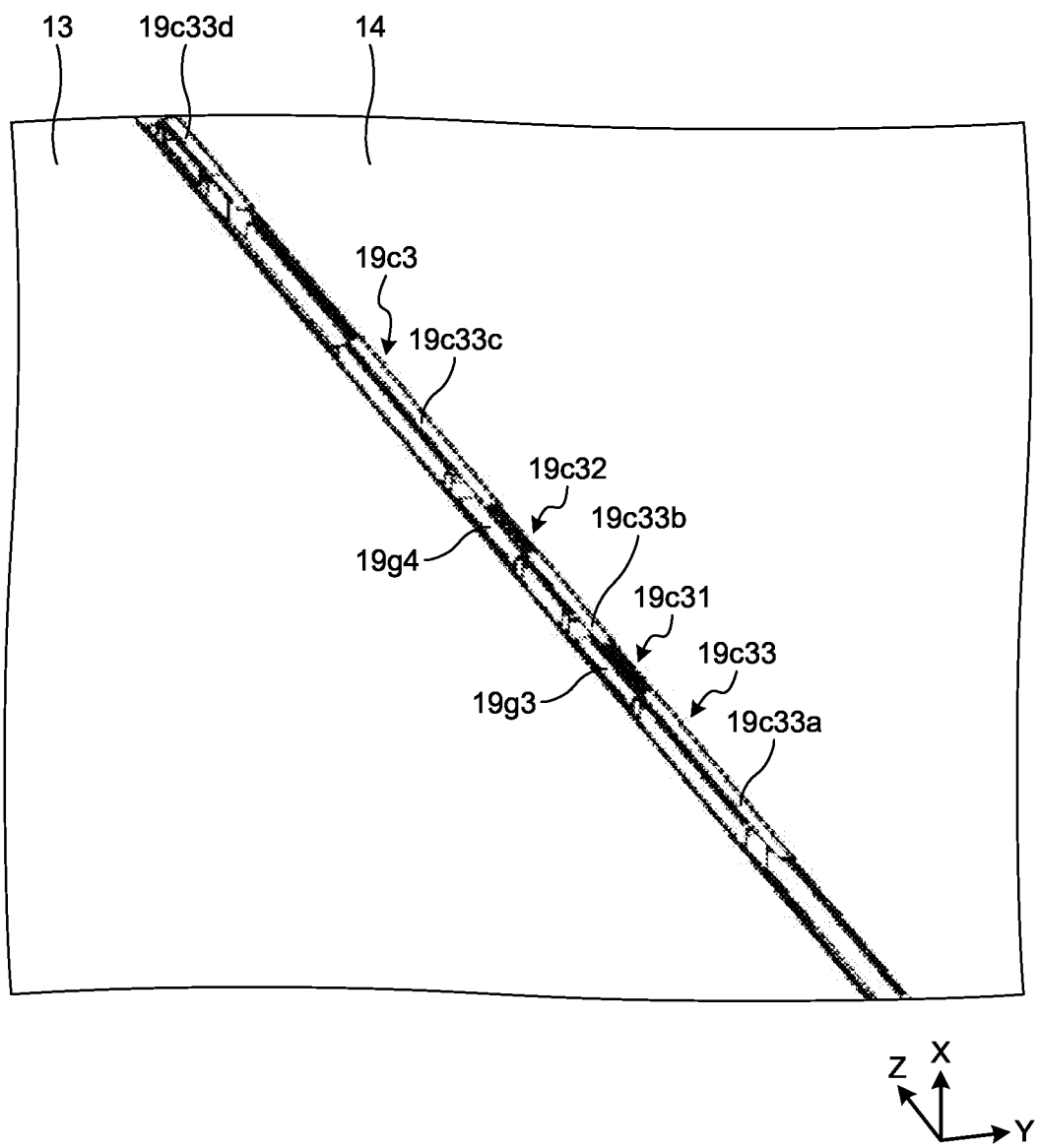
FIG. 15 is an enlarged perspective view illustrating the light guide plates and the fixing/positioning structure according to the embodiment.
Figure 16:
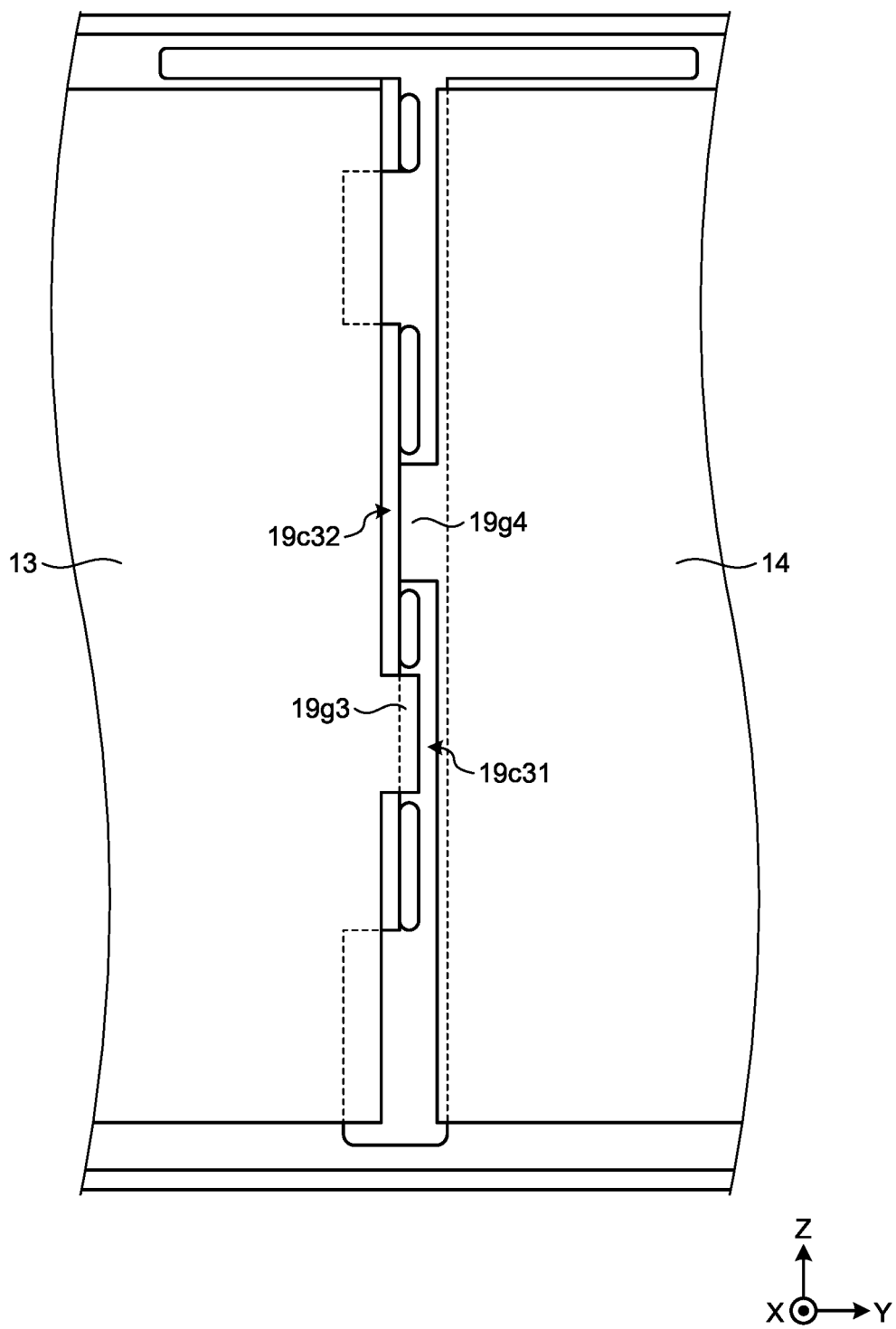
FIG. 16 is a plan view illustrating the light guide plates and the fixing/positioning structure according to the embodiment.

In the vicinity of the center in the Y-direction in the housing 18a, as illustrated in FIG. 15 and FIG. 16, the projection 19g3 of the light guide plate 13 engages with the notch 19c31 of the center member 19c3 in which the center mold 19d3 is embedded, and the projection 19g4 of the light guide plate 14 engages with the notch 19c32 of the center member 19c3 in which the center mold 19d4 is embedded. FIG. 15 is an enlarged perspective view illustrating the light guide plate and the fixing/positioning structure, and is a perspective view obtained by enlarging a portion I in FIG. 11. FIG. 16 is a plan view illustrating the light guide plate and the fixing/positioning structure.

The projection 19g3 projects in the +Y-direction from the vicinity of the center in the Z-direction of an end face, on the +Y side, of the light guide plate 13. The projection 19g3 has a plate shape extending in the YZ-direction having the Z-direction as a longitudinal direction, and a principal surface, on the −X side, and end faces, on the +Z side/−Z side, of the plate may abut on the center mold 19d3. Due to the engagement between the projection 19g3 and the notch 19c31 in which the center mold 19d3 is embedded, the light guide plate 13 can be positioned with respect to the housing 18a.

The projection 19g4 projects in the −Y-direction from the vicinity of the center in the Z-direction of an end face, on the −Y side, of the light guide plate 14. The projection 19g4 has a plate shape extending in the YZ-direction having the Z-direction as a longitudinal direction, and a principal surface, on the −X side, and end faces, on the +Z side/−Z side, of the plate may abut on the center mold 19d4. Due to the engagement between the projection 19g4 and the notch 19c32 in which the center mold 19d4 is embedded, the light guide plate 14 can be positioned with respect to the housing 18a.

As illustrated in FIG. 16, the positions of the projection 19g3 and the notch 19c31 and the positions of the projection 19g4 and the notch 19c32 are slightly shifted from each other in opposite directions from the vicinity of the center in the Z-direction not to interfere with each other.

FIG. 17 is obtained by removing the light guide plates 13 and 14 and the projections 19g3 and 19g4, and further enlarging the vicinity of the notches 19c31 and 19c32 of the center member 19c3 in which the center molds 19d3 and 19d4 are embedded. FIG. 17 is an enlarged perspective view illustrating the fixing/positioning structure 19. The center member 19c3 includes the base part 19c31 extending in the ZY-direction in a plate shape having the Z-direction as a longitudinal direction, a rising part 19c33 rising in the +X-direction from an end part, on the −Y side, of the base part 19c31, and a bar-shaped part 19c34 extending in the −Y-direction and the +Y-direction from an end part, on the +Z side, of the base part 19c31. The notch 19c31 corresponding to the projection 19g3 and the notch 19c32 corresponding to the projection 19g4 are disposed on the rising part 19c33. Correspondingly, a projection 19c33a, a projection 19c33b, a projection 19c33c, and a projection 19c33d are disposed on the rising part 19c33. The bar-shaped part 19c34 extends in the Y-direction along the inner wall of the housing 18a on the +Z side at the center, in the Y-direction, of the housing 18a. Due to this, the bar-shaped part 19c34 can improve strength and rigidity of the rear frame member 18 in the vicinity of the +Z side at the center in the Y-direction.

Figure 18:
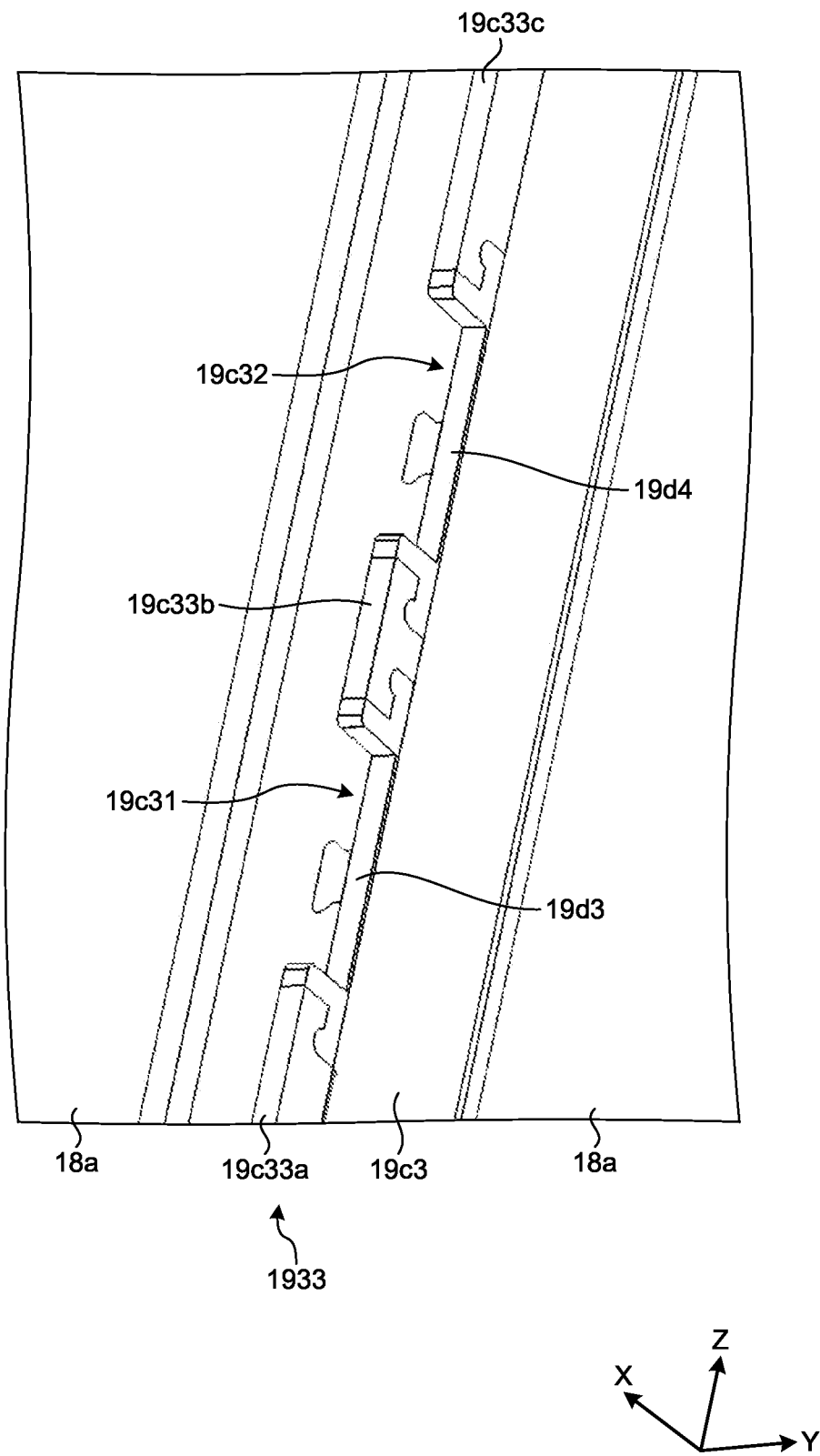
FIG. 18 is an enlarged perspective view illustrating the fixing/positioning structure according to the embodiment.

As illustrated in FIG. 18, a groove structure in which the center mold 19d3 is embedded is formed on the notch 19c31. FIG. 18 is an enlarged perspective view illustrating the fixing/positioning structure, and is an enlarged view of a portion K in FIG. 17. The center mold 19d3 is embedded in the groove structure by injection molding and the like using the groove structure as part of a mold, and forms side surfaces, on the +Z side/−Z side, and a bottom surface, on the −X side, of the recessed part. Hardness of a surface of the center mold 19d3 is smaller than that of the center member 19c3. Due to this, at the time when the light guide plates 13 are housed in the housing 18a of the rear frame member 18, the projection 19g3 and a peripheral part thereof tend to be preferentially brought into contact with the center mold 19d3, and the projection 19g3 and the peripheral part thereof can be prevented from being shaved or damaged.

A groove structure in which the center mold 19d4 is embedded is formed on the notch 19c32. The center mold 19d4 is embedded in the groove structure by injection molding and the like using the groove structure as part of a mold, and forms side surfaces, on the +Z side/−Z side, and a bottom surface, on the −X side, of the recessed part. Hardness of a surface of the center mold 19d4 is smaller than that of the center member 19c3. Due to this, at the time when the light guide plates 14 are housed in the housing 18a of the rear frame member 18, the projection 19g4 and a peripheral part thereof tend to be preferentially brought into contact with the center mold 19d3, and the projection 19g4 and the peripheral part thereof can be prevented from being shaved or damaged.

The center member 19c3 illustrated in FIG. 17 is fastened to the bottom wall part 181 of the rear frame member 18 by caulking work. On the base part 19c31 of the center member 19c3, wide parts 19c311 and 19c312 having the width that is partially increased in the Y-direction are disposed on the −Z side and the +Z side of the notches 19c31 and 19c32. A plurality of openings 19c313 and 19c314 are disposed on the wide part 19c311, and side walls of the respective openings 19c313 and 19c314 are fastened to the bottom wall part 181 of the rear frame member 18 by caulking work. A plurality of openings 19c315 and 19c316 are disposed on the wide part 19c312, and side walls of the respective openings 19c315 and 19c316 are fastened to the bottom wall part 181 of the rear frame member 18 by caulking work.

Figure 19:
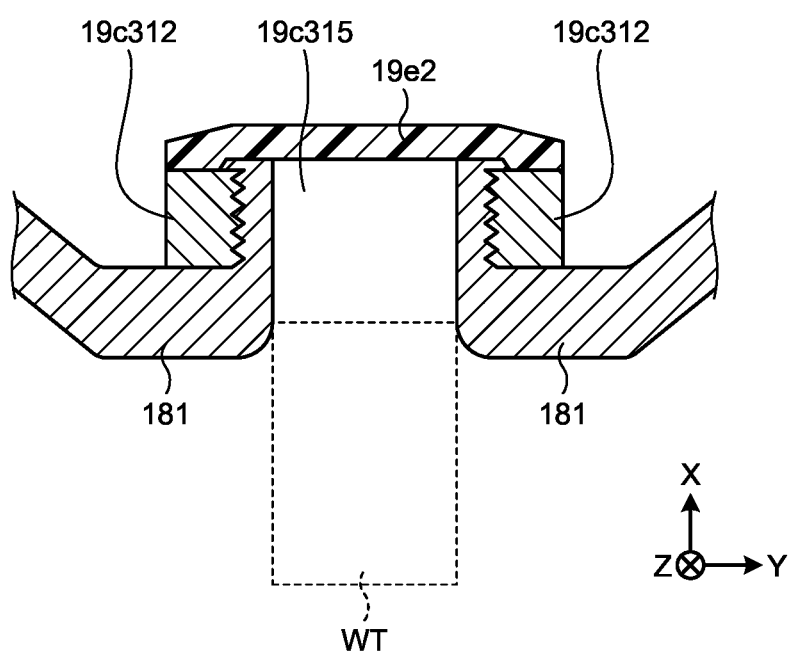
FIG. 19 is a cross-sectional view illustrating the caulking part according to the embodiment.

For example, a cross section obtained by cutting the vicinity of the opening 19c315 in FIG. 17 along the line L-L is illustrated in FIG. 19. FIG. 19 is a cross-sectional view illustrating a caulking part. An end face of the wide part 19c312 constituting a side wall of the opening 19c315 is a rough surface having surface roughness in some degree as illustrated in FIG. 19. When the working tool WT is disposed at a position corresponding to the opening 19c111, on the −X side, of the bottom wall part 181, and the working tool WT is pushed out toward the +X side, part of the bottom wall part 181 is bent toward the +X side, and pushed against the rough surface of the side wall of the opening 19c315 to become a rough surface. Due to this, the rough surface of the side wall of the opening 19c315 and the rough surface of the bent part of the bottom wall part 181 engage with and are fixed to each other.

Due to this, the number of components for fastening between the center member 19c3 and the rear frame member 18 can be reduced, and the center member 19c3 and the rear frame member 18 can be easily thinned.

Tape 19e1 illustrated in FIG. 4 is stuck to a surface, on the +X side, of the wide part 19c311 illustrated in FIG. 17, and each of the openings 19c313 and 19c314 may be blocked by the tape 19e1. Tape 19e2 illustrated in FIG. 4 is stuck to a surface, on the +X side, of the wide part 19c312, and each of the openings 19c315 and 19c316 may be blocked by the tape 19e2. For example, the cross-sectional view of FIG. 19 illustrates a state in which the opening 19c315 is blocked by the tape 19e2.

Accordingly, at the time when the light guide plates 13 and 14 are housed in the housing 18a of the rear frame member 18, it is possible to prevent light from leaking from the light guide plates 13 and 14 to the −X side of the rear frame member 18, and to reduce a loss in guiding light from the light guide plates 13 and 14 to the display panels 11 and 12. It is also possible to reduce dust entering toward the light guide plates 13 and 14 from a space on the −X side of the rear frame member 18.

The fixing/positioning structure 19 illustrated in FIG. 2 may include a structure in which the end parts of the light guide plates 13 and 14 engage with the end parts or the center part of the housing 18a in the vicinity of the center in the Z-direction. The fixing/positioning structure 19 may include a structure in which the projecting parts disposed at the end parts of the light guide plates 13 and 14 engage with the recessed parts disposed at the end parts or the center part of the housing 18a in the vicinity of the center in the Z-direction. Due to this, the display module 1 can easily narrow upper (+Z side) picture frames of the respective front frame member 16, the middle frame member 17, and the rear frame member 18.

For example, in a case of not disposing a structure in which the end part of the light guide plate 13 engage with the end part of the housing 18a in the vicinity of the center in the Z-direction, as illustrated in FIG. 20A, the width $W_{11}$ in the Z-direction of the light guide plate 13 is designed based on the position of the end part, on the −Z side, of the light guide plate 13. Assuming that a linear expansion coefficient of the light guide plate 13 is α, and a dimension at the time when an environment temperature is a reference temperature $T_a$ is $W_{10}$, the following numerical expression 1 represents the width $W_{11}$ ($T_1$) in the Z-direction of the light guide plate 13 that is thermally expanded at the time when the environment temperature becomes a high temperature $T_1$ (>$T_a$).

$$W_{11}(T_1) = W_{10} + W_{10} * \alpha * (T_1 - T_a) \quad \text{numerical expression 1}$$

The following numerical expression 2 represents the width $W_{11}$ in the Z-direction ($T_2$) of the light guide plate 13 at the time when the environment temperature is a low temperature $T_2$ (<$T_a$) and the light guide plate 13 is thermally contracted.

$$W_{11}(T_2) = W_{10} + W_{10} * \alpha * (T_2 - T_a) \quad \text{numerical expression 2}$$

A dimension $\Delta W_{11}$ of thermal expansion/contraction of the width $W_{11}$ in the Z-direction is represented by the following numerical expression 3.

$$\Delta W_{11} = W_{11}(T_1) - W_{11}(T_2) = W_{10} * \alpha * (T_1 - T_2) \quad \text{numerical expression 3}$$

As represented by the numerical expression 3, the dimension $\Delta W_{11}$ of thermal expansion/contraction of the light guide plate 13 is concentrated on an end part on the +Z side, so that a large clearance in the Z-direction is disposed on the +Z side of the light guide plate 13. Due to this, upper (+Z side) picture frames of the front frame member 16, the middle frame member 17, and the rear frame member 18 are difficult to be narrowed.

On the other hand, in a case of disposing a structure in which an end part of the light guide plate 13 engages an end part of the housing 18a in the vicinity of the center in the Z-direction, as illustrated in FIG. 20B, the width $W_{11}$ in the Z-direction of the light guide plate 13 is designed based on a position of an end part, on the −Z side, of the projection 19g1 of the light guide plate 13. Assuming that respective widths in the Z-direction from the end part, on the −Z side, of the projection 19g1 of the light guide plate 13 to an end part, on the +Z side, and an end part, on the −Z side, of the light guide plate 13 are $W_{21}$ and $W_{31}$, and dimensions at the time when the environment temperature is the reference temperature $T_a$ are $W_{20}$ and $W_{30}$, the following numerical expression 4 is established.

$$W_{10} = W_{20} + W_{30}, W_{20} < W_{10}, W_{30} < W_{10} \quad \text{numerical expression 4}$$

The following numerical expression 5 and numerical expression 6 represent respective widths $W_{21}$ and $W_{31}$ in the Z-direction from the end part, on the −Z side, of the projection 19g1 to the end part, on the +Z side, and the end part, on the −Z side, of the light guide plate 13 at the time when the environment temperature is a high temperature $T_1$ (>$T_a$) and the light guide plate 13 is thermally expanded.

$$W_{21}(T_1) = W_{20} + W_{20} * \alpha * (T_1 - T_a) \quad \text{numerical expression 5}$$

$$W_{31}(T_1) = W_{30} + W_{30} * \alpha * (T_1 - T_a) \quad \text{numerical expression 6}$$

The following numerical expression 7 and numerical expression 8 represent the respective widths $W_{21}$ and $W_{31}$ in the Z-direction from the end part, on the −Z side, of the projection 19g1 to the end part, on the +Z side, and the end part, on the −Z side, of the light guide plate 13 at the time when the environment temperature is a low temperature $T_2$ (<$T_a$) and the light guide plate 13 is thermally contracted.

$$W_{21}(T_2) = W_{20} + W_{20} * \alpha * (T_2 - T_a) \quad \text{numerical expression 7}$$

$$W_{31}(T_2) = W_{30} + W_{30} * \alpha * (T_2 - T_a) \quad \text{numerical expression 8}$$

Dimensions $\Delta W_{21}$ and $\Delta W_{31}$ of thermal expansion/contraction of the respective widths $W_{21}$ and $W_{31}$ in the Z-direction are represented by the following numerical expression 9 and numerical expression 10.

$$\Delta W_{21} = W_{21}(T_1) - W_{21}(T_2) = W_{20} * \alpha * (T_1 - T_2) \quad \text{numerical expression 9}$$

$$\Delta W_{31} = W_{31}(T_1) - W_{31}(T_2) = W_{30} * \alpha * (T_1 - T_2) \quad \text{numerical expression 10}$$

As represented by the numerical expression 9 and the numerical expression 10, the dimension of thermal expansion/contraction of the light guide plate 13 is divided into $\Delta W_{21}$ and $\Delta W_n$, and as represented by the numerical expression 3, the numerical expression 4, and the numerical expression 9, the dimension $\Delta W_{21}$ of thermal expansion/contraction of the end part, on the +Z side, of the light guide plate 13 is reduced. Due to this, the clearance in the Z-direction to be disposed on the +Z side of the light guide plate 13 can be downsized, so that the upper (+Z side) picture frames of the front frame member 16, the middle frame member 17, and the rear frame member 18 can be easily narrowed.

The fixing/positioning structure 19 illustrated in FIG. 2 fixes or positions the optical sheet 9 to the housing 18a. The fixing/positioning structure 19 includes a structure in which an end part of the optical sheet 9 engages with an end part or a center part of the housing 18a. The fixing/positioning structure 19 includes a structure in which a projecting part disposed at an end part of the optical sheet 9 engages with a recessed part disposed at an end part or a center part of the housing 18a. Due to this, the fixing/positioning structure 19 can position the light guide plates 13 and 14 to the housing 18a.

For example, as illustrated in FIG. 4, notches 19h1 and 19h2 are respectively disposed in the vicinity of the corner parts 18a2 and 18a4, on the +Z side, of the side wall parts 182, on the −Y side and the +Y side, of the rear frame member 18, and a notch 19h3 is disposed at the portion 18a5, on the +Z side, at the center, in the Y-direction, of the rear frame member 18. Each of the notches 19h1, 19h2, and 19h3 forms a recessed part.

Figure 21:
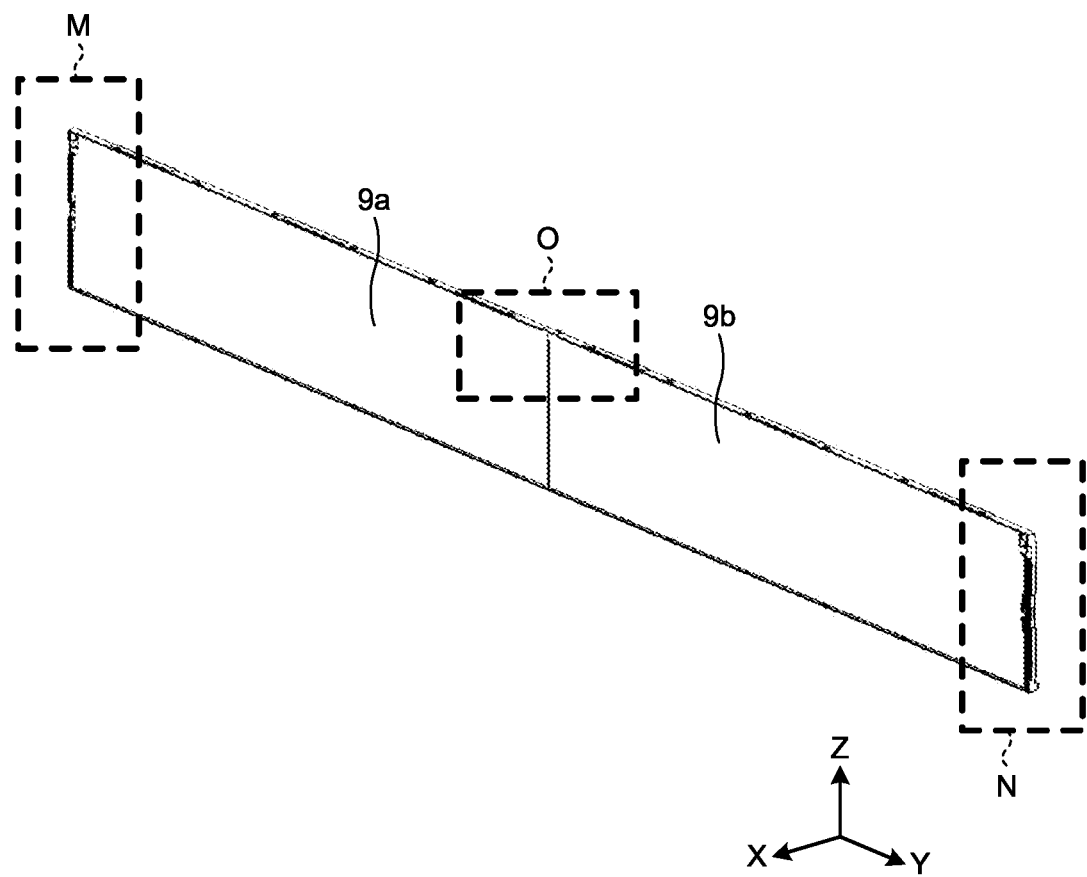
FIG. 21 is a perspective view illustrating optical sheets and the fixing/positioning structure according to the embodiment.

As illustrated in FIG. 21, projections 19i1 and 19i2 (refer to FIG. 22 and FIG. 23) corresponding to the notches 19h1 and 19h2 are respectively disposed in the vicinity of a corner part, on the −Y side/+Z side, of the optical sheet 9a (that is, each of the polarizing sheet 6a, the prism sheet 7a, and the diffusion sheet 8a), and in the vicinity of a corner part, on the +Y side/+Z side, of the optical sheet 9b (that is, each of the polarizing sheet 6b, the prism sheet 7b, and the diffusion sheet 8*b*). FIG. 21 is a perspective view illustrating the optical sheet and the fixing/positioning structure. Each of the projections 19*i*1 and 19*i*2 forms a projecting part. Projections 19*i*3 and 19*i*4 (refer to FIG. 24) corresponding to the notch 19*h*3 are respectively disposed in the vicinity of a corner part, on the +Y side/+Z side, of the optical sheet 9*a*, and in the vicinity of a corner part, on the −Y side/+Z side, of the optical sheet 9*b*. Each of the projections 19*i*3 and 19*i*4 forms a projecting part.

Figure 22:
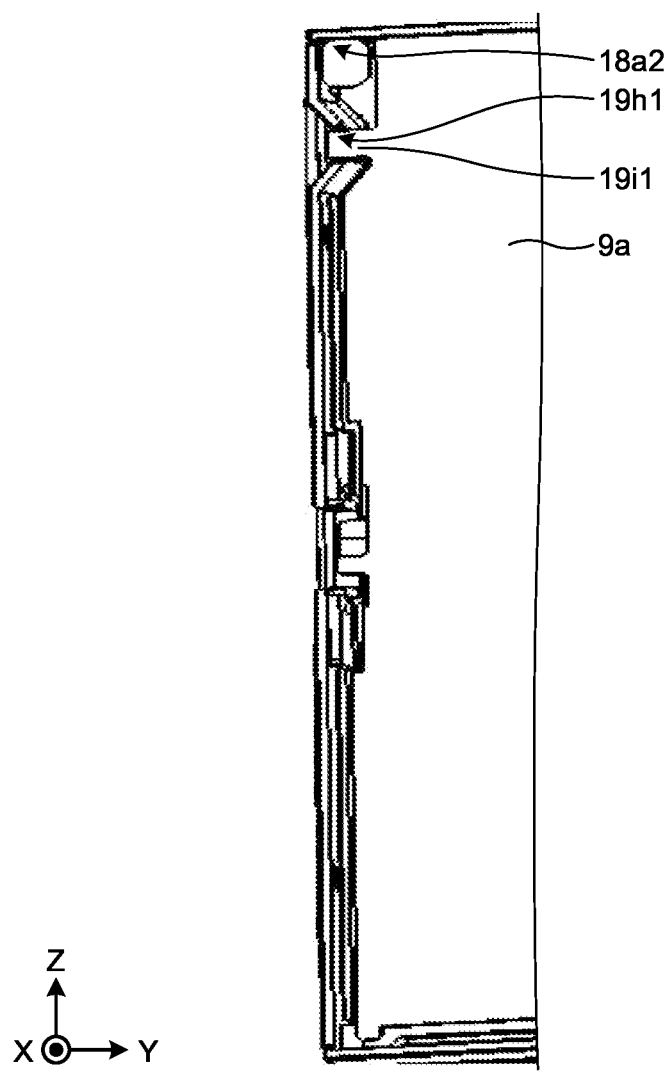
FIG. 22 is a perspective view illustrating the optical sheet and the fixing/positioning structure according to the embodiment.

In the vicinity of the corner part 18*a*2, on the −Y side/+Z side, of the housing 18*a*, as illustrated in FIG. 22, the projection 19*i*1 of the optical sheet 9*a* engages with the notch 19*h*1. FIG. 22 is a perspective view illustrating the optical sheet and the fixing/positioning structure, and is a perspective view obtained by enlarging a portion M in FIG. 21. The projection 19*i*1 projects in the −Y-direction from an end face on the −Y side in the vicinity of a corner part, on the −Y side/+Z side, of the optical sheet 9*a*. The projection 19*i*1 has a plate shape extending in the YZ-direction having the Y-direction as a longitudinal direction, and end faces, on the +Z side/−Z side, of the plate may abut on the notch 19*h*1. Due to the engagement between the projection 19*i*1 and the notch 19*h*1, the optical sheet 9*a* can be positioned with respect to the housing 18*a*.

Figure 23:
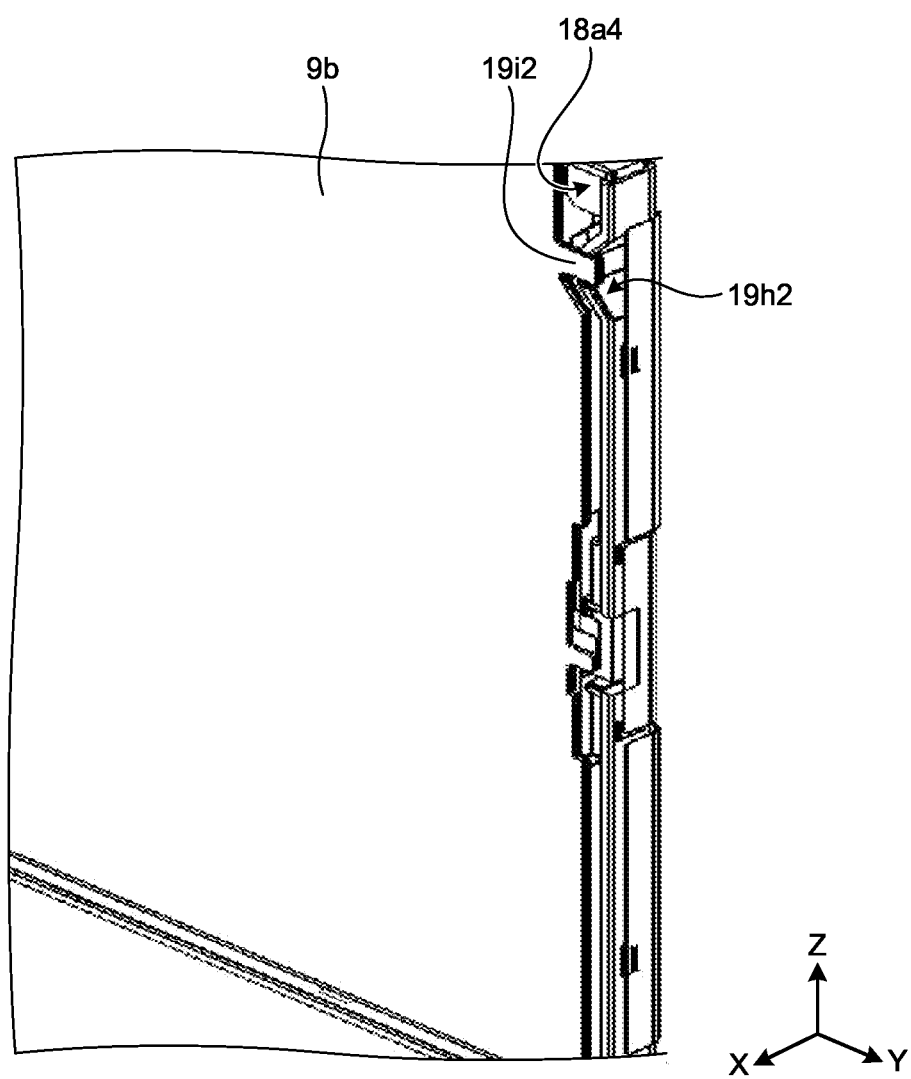
FIG. 23 is a perspective view illustrating the optical sheet and the fixing/positioning structure according to the embodiment.

In the vicinity of the corner part 18*a*4, on the +Y side/+Z side, of the housing 18*a*, as illustrated in FIG. 23, the projection 19*i*2 of the optical sheet 9*b* engages with the notch 19*h*2. FIG. 23 is a perspective view illustrating the optical sheet and the fixing/positioning structure, and is a perspective view obtained by enlarging a portion N in FIG. 21. The projection 19*i*2 projects in the +Y-direction from an end face, on the +Y side, in the vicinity of a corner part, on the +Y side/+Z side, of the optical sheet 9*b*. The projection 19*i*2 has a plate shape extending in the YZ-direction having the Y-direction as a longitudinal direction, and end faces, on the +Z side/−Z side, of the plate may abut on the notch 19*h*2. Due to the engagement between the projection 19*i*2 and the notch 19*h*2, the optical sheet 9*b* can be positioned with respect to the housing 18*a*.

Figure 24:
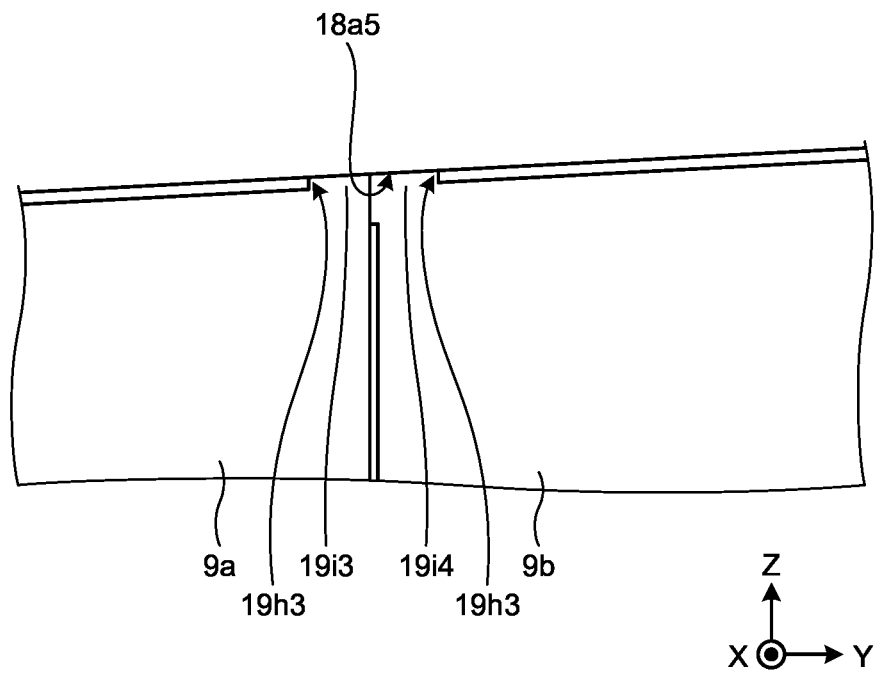
FIG. 24 is a perspective view illustrating the optical sheets and the fixing/positioning structure according to the embodiment.

At the portion 18*a*5, on the +Z side, at the center, in the Y-direction, of the housing 18*a*, as illustrated in FIG. 24, the projection 19*i*3 of the optical sheet 9*a* and the projection 19*i*4 of the optical sheet 9*b* engage with the notch 19*h*3. FIG. 24 is a perspective view illustrating the optical sheet and the fixing/positioning structure, and is a perspective view obtained by enlarging a portion O in FIG. 21. The projection 19*i*3 projects in the +Z-direction from an end face, on the +Z side, in the vicinity of a corner part, on the +Y side/+Z side, of the optical sheet 9*a*. The projection 19*i*3 has a plate shape extending in the YZ-direction having the Y-direction as a longitudinal direction, and an end face, on the −Y side, of the plate may abut on the notch 19*h*3. The projection 19*i*4 projects in the +Z-direction from an end face, on the +Z side, in the vicinity of a corner part, on the −Y side/+Z side, of the optical sheet 9*a*. The projection 19*i*4 has a plate shape extending in the YZ-direction having the Y-direction as a longitudinal direction, and an end face, on the +Y side, of the plate may abut on the notch 19*h*3. When the projection 19*i*3 and the projection 19*i*4 engage with the notch 19*h*3, the optical sheets 9*a* and 9*b* can be positioned with respect to the housing 18*a*.

Figure 25:
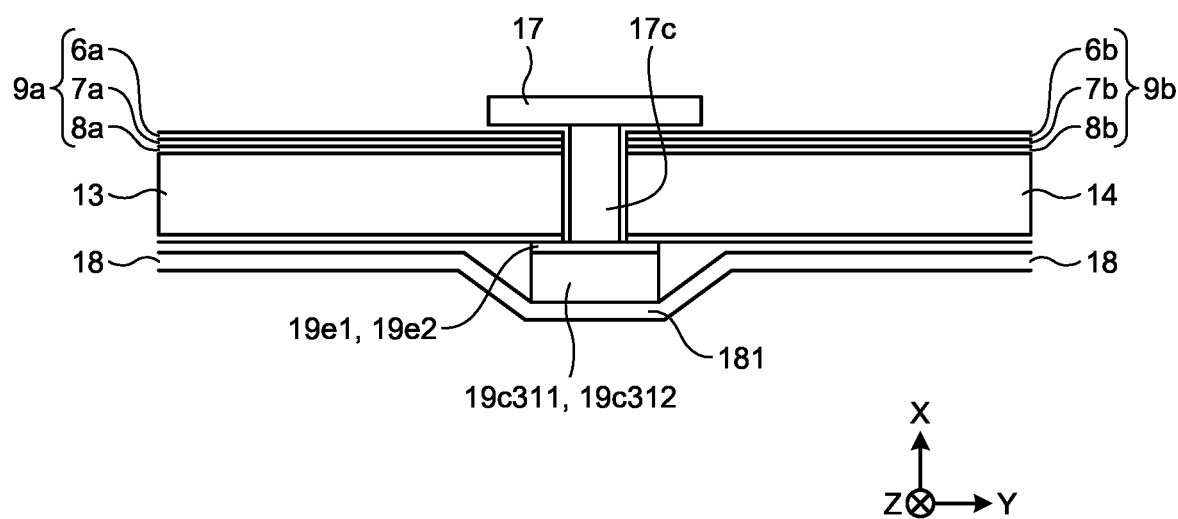
FIG. 25 is a cross-sectional view illustrating a state in which the optical sheets and the light guide plates are fixed by a middle frame according to the embodiment.

In a state in which the light guide plates 13 and 14 are fixed or positioned by the fixing/positioning structure 19, and the optical sheets 9*a* and 9*b* are fixed or positioned by the fixing/positioning structure 19, as illustrated in FIG. 25, a support portion 15*c* at the center in the Y-direction of the middle frame member 17 may abut on the wide parts 19*c*311 and 19*c*312 of the center member 19*c*3 via pieces of the tape 19*e*1 and 19*e*2. Due to this, the middle frame member 17 and the rear frame member 18 can stably hold the light guide plates 13 and 14 and the optical sheets 9*a* and 9*b*. The wide parts 19*c*311 and 19*c*312 are joined to the bottom wall part 181 of the rear frame member 18 by caulking (refer to FIG. 19), so that the height of the surface, on the +X side, of the middle frame member 17 from the surface, on the −X side, of the rear frame member 18 can be easily suppressed.

As described above, in the present embodiment, in the display module 1, the fixing/positioning structure 19 is disposed to fix or position the light guide plates 13 and 14 to the housing 18*a* of the rear frame member 18 that houses the light guide plates 13 and 14. The fixing/positioning structure 19 includes a structure in which the elastic member pushes the light guide plates 13 and 14 against the inner wall of the housing 18*a*. The fixing/positioning structure 19 includes a structure in which the end parts of the light guide plates 13 and 14 engage with the end parts or the center part of the housing 18*a*. Due to this, work of assembling the light guide plates 13 and 14 to the rear frame member 18 can be facilitated, and a manufacturing yield of the display module 1 can be easily improved.

In the present embodiment, in the display module 1, the light emitting element 15 that may be a heat source is positioned at the end part on the −Z side in the display module 1, and the drive circuit elements 11*b* and 12*b* that may be other heat sources are positioned at the end part, on the +Y side and the end part on the −Y side in the display module 1. Due to this, in a case of viewing the entire display module 1, the heat sources are disposed in a distributed manner, and heat from the heat sources may be efficiently radiated.

In the present embodiment, in the display module 1, the light emitting element 15 is disposed under (on the −Z side of) the light guide plates 13 and 14, so that the upper (+Z side) portions of the rear frame member 18, the middle frame member 17, and the front frame member 16 can be easily narrowed.

In place of the elastic members 19*a*1 to 19*a*5, the fixing/positioning structure 19 may fix the light guide plates 13 and 14 to the housing 18*a* by tape, may fix the light guide plates 13 and 14 to the housing 18*a* by screw fastening, or may fix the light guide plates 13 and 14 to the housing 18*a* by claw engagement.

Figure 26:
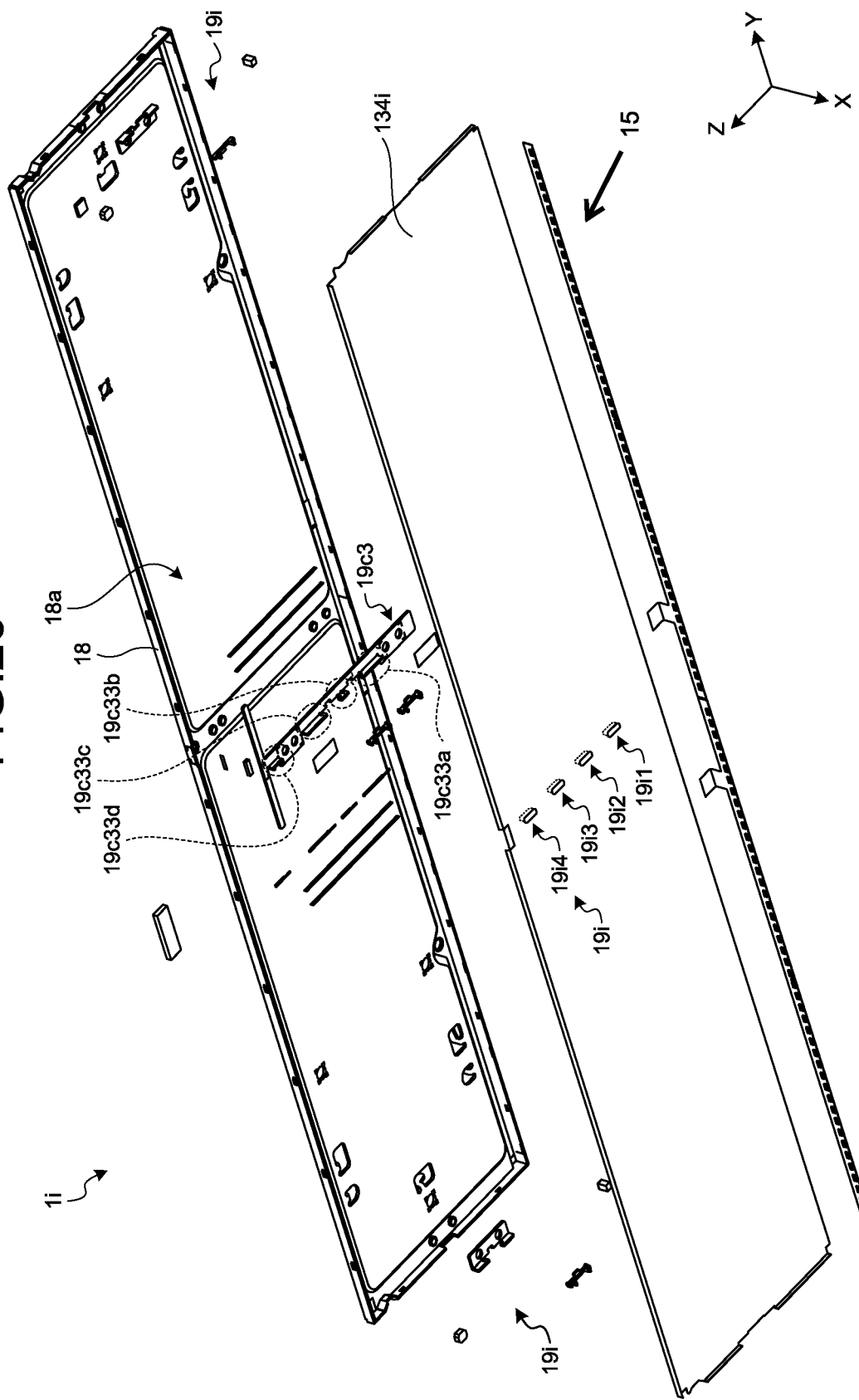
FIG. 26 is an exploded perspective view illustrating a light guide plate, a light emitting element, a rear frame member, and a fixing/positioning structure according to a first modification of the embodiment.

As illustrated in FIG. 26, a display module 1*i* may include one light guide plate 134*i* in place of the light guide plates 13 and 14 (refer to FIG. 4). FIG. 26 is an exploded perspective view illustrating the light guide plate, the light emitting element, the rear frame member, and the fixing/positioning structure according to a first modification of the embodiment. The width in the Y-direction of the light guide plate 134*i* corresponds to the sum total of the widths in the Y-direction of the display panels 11 and 12. In a fixing/positioning structure 19*i*, a structure in which the projections 19*g*3 and 19*g*4 (refer to FIG. 4) engage with two recessed portions of the center member 19*c*3 is omitted.

In this case, the fixing/positioning structure 19*i* may include a structure in which a hole disposed at the center of the light guide plate 134*i* engage with a projection disposed at the center of the housing 18. For example, on the center member 19*c*3, the projections 19*c*33*a*, 19*c*33*b*, 19*c*33*c*, and 19*c*33*d* arranged in the Z-direction are disposed in the vicinity of the center in the Y-direction of the housing 18*a*. On the light guide plate 134*i*, the openings 19*i*1, 19*i*2, 19*i*3, and 19*i*4 arranged in the Z-direction are disposed in the vicinity of the center in the Y-direction. The projections 19c33a, 19c33b, 19c33c, and 19c33d can engage with the openings 19i1, 19i2, 19i3, and 19i4. Due to this, the fixing/positioning structure 19 can position the light guide plate 134i with respect to the housing 18a.

Figure 27:
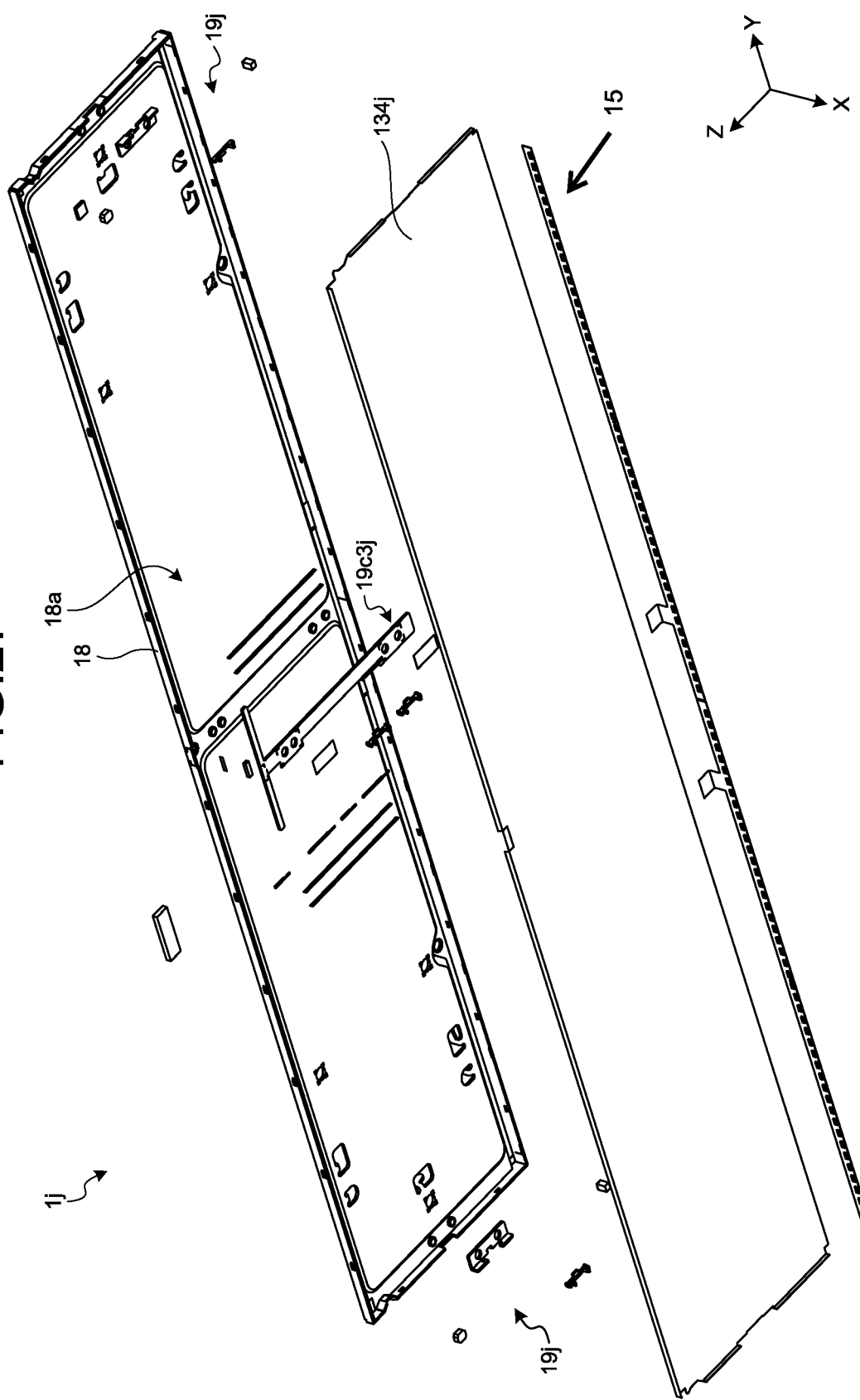
FIG. 27 is an exploded perspective view illustrating a light guide plate, a light emitting element, a rear frame member, and a fixing/positioning structure according to a second modification of the embodiment.

As illustrated in FIG. 27, if the projections 19c33a to 19c33d (refer to FIG. 26) of a center member 19c3j are omitted in a display module 1j, the openings 19i1 to 19i4 are not necessarily disposed on a light guide plate 134j. FIG. 27 is an exploded perspective view illustrating the light guide plate, the light emitting element, the rear frame member, and the fixing/positioning structure according to a second modification of the embodiment. If the openings 19i1 to 19i4 are not disposed, the strength of the light guide plate 134j may be further improved. In this case, a structure in which the projections 19g3 and 19g4 (refer to FIG. 4) engage with the two recessed portions of the center member 19c3 is omitted in the fixing/positioning structure 19j, but the light guide plate 134j can be fixed or positioned to the housing 18a by the other structures that are the same as those in the embodiment.

With the display module according to the present disclosure, assembly work can be facilitated.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display module, comprising:
a plurality of display panels;
a backlight module including a plurality of light guide plates disposed in back of the plurality of display panels and a light emitting element disposed around the plurality of light guide plates;
a middle frame member that is disposed in back of the plurality of display panels and in front of the plurality of light guide plates, and includes a plurality of openings corresponding to the plurality of display panels;
a rear frame member that is disposed in back of the plurality of light guide plates, and includes a housing that houses the plurality of light guide plates; and
a first structure that fixes or positions the plurality of light guide plates to the housing,
wherein the plurality of light guide plates are arranged side by side along a longitudinal direction of the plurality of light guide plates, and
the light emitting element is disposed under the plurality of light guide plates and extends along the longitudinal direction of the plurality of light guide plates.

2. The display module according to claim 1,
wherein the first structure includes a second structure in which an elastic member pushes the plurality of light guide plates against an inner wall of the housing.

3. The display module according to claim 2,
wherein the housing has a rectangular shape in a planar view, and
the elastic member is interposed between the housing and the plurality of light guide plates at a corner part and a central upper part of the housing.

4. The display module according to claim 1,
wherein the first structure includes a second structure in which an end part of the plurality of light guide plates engages with an end part or a center part of the housing.

5. The display module according to claim 4,
wherein the second structure includes a projecting part disposed at an end part of the plurality of light guide plates and a recessed part disposed at an end part or a center part of the housing, and
the projecting part engages with the recessed part.

6. The display module according to claim 1,
wherein the backlight module further includes an optical sheet disposed in back of the middle frame member and in front of the plurality of light guide plates,
the housing further houses the optical sheet, and
the first structure fixes or positions the optical sheet to the housing.

7. The display module according to claim 1,
wherein the plurality of display panels are arranged side by side along a longitudinal direction of the plurality of display panels, and include a circuit element in a vicinity of an outer end part in the longitudinal direction of the plurality of display panels.

8. A display module, comprising:
a plurality of display panels;
a light guide plate that has a width in a longitudinal direction corresponding to a width of the plurality of display panels, and is disposed in back of the plurality of display panels;
a light emitting element disposed around the light guide plate;
a middle frame member that is disposed in back of the plurality of display panels and in front of the light guide plate, and has a plurality of openings corresponding to the plurality of display panels;
a rear frame member that is disposed in back of the light guide plate, and includes a housing that houses the light guide plate; and
a first structure that fixes or positions the light guide plate to the housing,
wherein the first structure includes a second structure in which an elastic member pushes the light guide plate against an inner wall of the housing,
the housing has a rectangular shape in a planar view, and
the elastic member is interposed between the housing and the light guide plate at a corner part of the housing.

9. The display module according to claim 8,
wherein the first structure includes a third structure in which an end part of the light guide plate engages with an end part of the housing.

10. The display module according to claim 9,
wherein the third structure includes a projecting part disposed at an end part of the light guide plate and a recessed part disposed at an end part of the housing, and
the projecting part engages with a recessed part.

11. The display module according to claim 9,
wherein the third structure includes a hole disposed at a center of the light guide plate a projection disposed at a center of the housing, and the hole engages with the projection.

12. A display module, comprising:
a plurality of display panels;
a light guide plate that has a width in a longitudinal direction corresponding to a sum total of widths of the plurality of display panels, and is disposed in back of the plurality of display panels;

a light emitting element disposed around the light guide plate;

a middle frame member that is disposed in back of the plurality of display panels and in front of the light guide plate, and has a plurality of openings corresponding to the plurality of display panels, a rear frame member that is disposed in back of the light guide plate, and includes a housing that houses the light guide plate; and a first structure that fixes or positions the light guide plate to the housing, wherein the light emitting element is disposed under the light guide plate and extends along the longitudinal direction of the light guide plate.

* * * * *